US008565811B2

(12) United States Patent
Tan et al.

(10) Patent No.: US 8,565,811 B2
(45) Date of Patent: Oct. 22, 2013

(54) SOFTWARE-DEFINED RADIO USING MULTI-CORE PROCESSOR

(75) Inventors: Kun Tan, Beijing (CN); Jiansong Zhang, Beijing (CN); Yongguang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 808 days.

(21) Appl. No.: 12/535,415

(22) Filed: Aug. 4, 2009

(65) Prior Publication Data

US 2011/0035522 A1 Feb. 10, 2011

(51) Int. Cl.
*H04M 1/00* (2006.01)
*G06F 13/00* (2006.01)
*G06F 7/38* (2006.01)

(52) U.S. Cl.
USPC ............ 455/550.1; 455/556.1; 455/557; 455/90.2; 711/100; 712/220

(58) Field of Classification Search
USPC ............ 455/550.1, 552.1, 553.1, 556.1, 557, 455/90.1, 90.2; 711/100; 712/220
See application file for complete search history.

(56) References Cited

U.S. PATENT DOCUMENTS

| | | | |
|---|---|---|---|
| 5,099,417 A * | 3/1992 | Magar et al. | 710/27 |
| 5,212,777 A * | 5/1993 | Gove et al. | 712/229 |
| 5,708,593 A | 1/1998 | Saby et al. | |
| 5,784,640 A * | 7/1998 | Asghar et al. | 712/35 |
| 5,930,298 A | 7/1999 | Choi | |
| 6,114,971 A | 9/2000 | Nysen | |
| 6,167,031 A | 12/2000 | Olofsson et al. | |
| 6,182,030 B1 | 1/2001 | Hagen et al. | |
| 6,188,702 B1 | 2/2001 | Tornetta et al. | |
| 6,298,370 B1 * | 10/2001 | Tang et al. | 718/102 |
| 6,351,499 B1 | 2/2002 | Paulraj et al. | |
| 6,415,415 B1 | 7/2002 | Karabed | |
| 6,557,062 B1 | 4/2003 | Shaler et al. | |
| 6,578,153 B1 | 6/2003 | Sankey et al. | |
| 6,587,671 B1 | 7/2003 | Kanago et al. | |
| 6,654,428 B1 | 11/2003 | Bose et al. | |
| 6,665,311 B2 | 12/2003 | Kondylis et al. | |
| 6,735,448 B1 | 5/2004 | Krishnamurthy et al. | |
| 6,748,034 B2 | 6/2004 | Hattori et al. | |
| 6,788,702 B1 | 9/2004 | Garcia-Luna-Aceves et al. | |
| 6,825,827 B2 * | 11/2004 | Miura | 345/98 |
| 6,864,715 B1 | 3/2005 | Bauer et al. | |

(Continued)

FOREIGN PATENT DOCUMENTS

WO WO9901945 1/1999
WO WO2006083495 A2 8/2006

OTHER PUBLICATIONS

Bahl et al, "White Space Networking with WI-FI like Connectivity," SIGCOMM '09, Barcelona, Spain, Aug. 17-21, 2009, 12 pgs.

(Continued)

*Primary Examiner* — Duc M Nguyen
(74) *Attorney, Agent, or Firm* — Lee & Hayes, PLLC

(57) ABSTRACT

A radio control board passes a plurality of digital samples between a memory of a computing device and a radio frequency (RF) transceiver coupled to a system bus of the computing device. Processing of the digital samples is carried out by one or more cores of a multi-core processor to implement a software-defined radio.

19 Claims, 19 Drawing Sheets

(56) References Cited

U.S. PATENT DOCUMENTS

| | | | |
|---|---|---|---|
| 6,963,579 | B2 | 11/2005 | Suri |
| 7,072,818 | B1 | 7/2006 | Beardslee et al. |
| 7,142,617 | B2 | 11/2006 | Mohan |
| 7,162,204 | B2 | 1/2007 | Hansen et al. |
| 7,174,145 | B2 | 2/2007 | Chatelier et al. |
| 7,230,978 | B2 | 6/2007 | Bitterlich et al. |
| 7,404,074 | B2 | 7/2008 | Murotake |
| 7,444,168 | B2 * | 10/2008 | Nakagawa et al. ......... 455/557 |
| 7,565,140 | B2 | 7/2009 | Levy et al. |
| 7,610,017 | B2 * | 10/2009 | Girardeau et al. ............. 455/59 |
| 7,738,913 | B2 * | 6/2010 | Hilpisch et al. ........... 455/550.1 |
| 7,774,017 | B2 * | 8/2010 | Irita et al. .................. 455/550.1 |
| 7,894,556 | B2 | 2/2011 | Casabona et al. |
| 2002/0126704 | A1 | 9/2002 | Cam et al. |
| 2002/0155811 | A1 | 10/2002 | Prismantas et al. |
| 2004/0068730 | A1* | 4/2004 | Miller et al. ................. 718/106 |
| 2004/0153957 | A1 | 8/2004 | Feldman et al. |
| 2004/0156449 | A1* | 8/2004 | Bose et al. ..................... 375/316 |
| 2004/0252684 | A1 | 12/2004 | Evans et al. |
| 2005/0124330 | A1* | 6/2005 | Hong et al. .................. 455/418 |
| 2005/0202848 | A1 | 9/2005 | Chang |
| 2006/0015674 | A1 | 1/2006 | Murotake |
| 2006/0115012 | A1 | 6/2006 | Sadowsky et al. |
| 2006/0145897 | A1* | 7/2006 | Kadono et al. ................. 341/59 |
| 2006/0168587 | A1 | 7/2006 | Aslam-Mir |
| 2006/0190904 | A1 | 8/2006 | Haji-Aghajani et al. |
| 2006/0212624 | A1 | 9/2006 | Kim |
| 2006/0227856 | A1* | 10/2006 | Ledvina et al. .............. 375/150 |
| 2007/0076649 | A1 | 4/2007 | Lin et al. |
| 2007/0083786 | A1 | 4/2007 | Chiang |
| 2007/0092018 | A1 | 4/2007 | Fonseka et al. |
| 2007/0155429 | A1 | 7/2007 | Levy et al. |
| 2007/0178841 | A1 | 8/2007 | Oliynyk et al. |
| 2007/0247139 | A1 | 10/2007 | Veroni et al. |
| 2008/0003949 | A1 | 1/2008 | Voonna et al. |
| 2008/0043668 | A1 | 2/2008 | Chen et al. |
| 2008/0095100 | A1 | 4/2008 | Cleveland et al. |
| 2008/0095135 | A1 | 4/2008 | Cleveland |
| 2008/0098133 | A1 | 4/2008 | Shaanan et al. |
| 2008/0130519 | A1 | 6/2008 | Bahl et al. |
| 2008/0165754 | A1 | 7/2008 | Hu |
| 2008/0175421 | A1 | 7/2008 | Chizari |
| 2008/0178062 | A1 | 7/2008 | Norris et al. |
| 2008/0232487 | A1 | 9/2008 | Cleveland et al. |
| 2008/0261639 | A1 | 10/2008 | Sun et al. |
| 2008/0261650 | A1 | 10/2008 | Piriyapoksombut et al. |
| 2008/0300006 | A1* | 12/2008 | Rofougaran et al. ....... 455/552.1 |
| 2008/0320529 | A1 | 12/2008 | Louchkoff et al. |
| 2009/0034457 | A1 | 2/2009 | Bahl et al. |
| 2009/0061783 | A1 | 3/2009 | Choi et al. |
| 2009/0063057 | A1 | 3/2009 | Miettinen |
| 2009/0088104 | A1 | 4/2009 | Cheng et al. |
| 2009/0089556 | A1 | 4/2009 | Lee et al. |
| 2009/0110033 | A1 | 4/2009 | Shattil |
| 2009/0119570 | A1 | 5/2009 | Eder et al. |
| 2009/0156129 | A1 | 6/2009 | Hassan et al. |
| 2009/0160486 | A1 | 6/2009 | Lee |
| 2009/0175381 | A1 | 7/2009 | Bougard |
| 2009/0196180 | A1 | 8/2009 | Bahl et al. |
| 2009/0197627 | A1 | 8/2009 | Kuffner et al. |
| 2009/0204725 | A1 | 8/2009 | Liu et al. |
| 2009/0235316 | A1 | 9/2009 | Wu et al. |
| 2009/0253376 | A1 | 10/2009 | Parssinen et al. |
| 2009/0258603 | A1 | 10/2009 | Ghaboosi et al. |
| 2009/0298522 | A1 | 12/2009 | Chaudhri et al. |
| 2009/0323600 | A1 | 12/2009 | Chandra et al. |
| 2010/0031098 | A1 | 2/2010 | Kobayashi |
| 2010/0048234 | A1 | 2/2010 | Singh |
| 2010/0075704 | A1 | 3/2010 | McHenry et al. |
| 2010/0159855 | A1 | 6/2010 | Hardacker et al. |
| 2010/0232369 | A1 | 9/2010 | Jing et al. |
| 2010/0246506 | A1 | 9/2010 | Krishnaswamy |
| 2010/0260137 | A1 | 10/2010 | Vrzic et al. |
| 2010/0301992 | A1 | 12/2010 | Chandra et al. |
| 2010/0309806 | A1 | 12/2010 | Wu et al. |
| 2011/0096658 | A1 | 4/2011 | Yang et al. |

OTHER PUBLICATIONS

Chandra et al, "A Case for Adapting Channel Width in Wireless Networks," In Proceedings of the ACM SIGCOMM '08 Conference on Data Communication, Aug. 17-22, 2008, Seattle, Washington, 12 pgs.

Dutta et al, "An Intelligent Physical Layer for Cognitive Radio Networks," Proceedings of the 4th Annual International Conference on Wireless Internet, WICON '08, Nov. 17-19, 2008, 9 pgs.

"WBX," Ettus Research LLC, retrieved from <<http://www.ettus.com/WBX>> on Apr. 25, 2011, 1 pg.

"Welcome to Ettus Research," Ettus Research LLC, retrieved from <<http://www.ettus.com>> on Apr. 25, 2011, 2 pgs.

Gockler et al, "Parallelisation of Digital Signal Processing in Uniform and Reconfigurable Filter Banks for Satellite Communications," IEEE Asia Pacific Conference on Circuits and Systems, APCCAS 2006, Dec. 4-7, 2006, 4 pgs.

Li et al, "A Frequency Hopping Spread Spectrum Transmission Scheme for Uncoordinated Cognitive Radios," IEEE International Conference on Acoustics, Speech and Signal Processing, ICASSP 2009, Taipei, Apr. 19-24, 2009, pp. 2345-2348.

Microsoft Research, "WhiteFiService Home," retrieved from <<http://whitespaces.msresearch.us>> on Apr. 25, 2011, 2 pgs.

Mody et al, "Machine Learning Based Cognitive Communications in White as Well as the Gray Space," IEEE, 2007, pp. 1-7.

Narlanka et al, "A Hardware Platform for Utilizing TV Bands With a Wi-Fi Radio," 15th IEEE Workshop on Local & Metropolitan Area Networks, LANMAN 2007, New York, NY, Jun. 10-13, 2007, 5 pgs.

Park et al, "Frequency-Domain Channel Estimation and Equalization for Continuous-Phase Modulations With Superimposed Pilot Sequences," IEEE Transactions on Vehicular Technology, vol. 58, No. 9, Nov. 2009, pp. 4903-4908.

"Radio Technology from Full Spectrum used in White Space," Radio Electronics.com, retrieved from <<http://www.radio-electronics.com/news/radio-receivers/radio-technology-from-full-spectrum-used-48>>, Sep. 22, 2010, 2 pgs.

Rahul et al, "Learning to Share: Narrowband-Friendly Wideband Networks," In Proceedings of the ACM SIGCOMM '08 Conference on Data Communication, Aug. 17-22, 2008, Seattle, Washington, 12 pgs.

Smirnov et al, "The Use of Spectral Analysis in Identifying Applications Runny on Enterprise Data Center Systems," CMG Computer Measurement Group, retrieved from <<http://www.cmg.org/measureit/issues/mit62/m_62_11.html>>, Aug. 2009, 6 pgs.

"Software Radio," Microsoft Research, retreived from <<http://research.microsoft.com/sora>> on Apr. 25, 2011, 3 pgs.

Suzuki et al, "Proposal of Band-Limited Divided-Spectrum Single Carrier Transmission for Dynamic Spectrum Controlled Access in ISM Band," Personal, Indoor and Mobile Radio Communications, 2009 IEEE 20th International Symposium, Sep. 3-16, 2009, pp. 132-136.

Wang et al, "List-Coloring Based Channel Allocation for Open-Spectrum Wireless Networks," IEEE, 2005, pp. 690-694.

Yang et al, "Supporting Demanding Wireless Applications with Frequency-agile Radios," Proceedings of 7th USENIX Symposium on Networked Systems Design and Implementation (NSDI 2010), San Jose, California, Apr. 2010, pp. 1-15.

Zaki et al, "LTE Wireless Virtualization and Spectrum Management," 2010 Third Joint IFIP, Wireless and Mobile Networking Conference (WMNC), Budapest, Oct. 13-15, 2010, 6 pgs.

PCT Intl Search Report (PCT/US2010/049013) dtd May 13, 2011.

Bougard, et al., "A Coarse-Grained Array Accelorator for Software-Defined Radio Baseband Processing", retrieved on Jun. 19, 2009 at <<http://ieeexplore.ieee.org/stamp/stamp.jsp?tp=&arnumber=4626817&isnumber=4626808>>, IEEE Micro, Jul.-Aug. 2008, pp. 41-50.

Boyd-Wickizer, et al., "Corey: an operating system for many cores", retrieved on Jun. 19, 2009 at <<http://www.mit.edu/~y_z/papers/corey-osdi08.pdf>>, pp. 1-14.

(56) References Cited

OTHER PUBLICATIONS

Cummings, et al., "FPGA in the Software Radio", retrieved on Jun. 19, 2009 at <<http://ieeexplore.ieee.org/stamp/stamp.jsp?tp=&arnumber=747258>>, IEEE Communications Magazine, Feb. 2009, pp. 108-112.
Glossner, et al., "A Software-Defined Communications Baseband Design", retrieved on Jun. 19, 2009 at <<http://ieeexplore.ieee.org/stamp/stamp.jsp?tp=&arnumber=1166669&isnumber=26307>>, IEEE Communications Magazine, Jan. 2003, pp. 120-128.
Glossner, et al., "The Sandbridge Sandblaster Communications Processor", 3rd Workshop on Application Specific Processors, 2004.
"GNU Radio", retrieved on Jun. 19, 2009 at <<http://www.gnu.org/software/gnuradio/>>, 2 pages.
Goldsmith, "Wireless Communications", retrieved on Jun. 19, 2009 at <<http://assets.cambridge.org/97805218/37163/copyright/9780521837163_copyright.pdf>>, Cambridge University Press, 2 pages.
"Host AP driver for Intersil Prism2/2.5/3, hostapd, and WPA Supplicant", retrieved on Jun. 19, 2009 at <<http://hostap.epitest.fi/>>, Mar. 23, 2009, 4 pages.
Jamieson, et al., "PPR: Partial Packet Recovery for Wireless Networks", retrieved on Jun. 19, 2009 at <<http://nms.lcs.mit.edu/papers/fp315-jamieson.pdf>>, SIGCOMM 2007, ACM 2007, 12 pages.
Katti, et al., "Embracing Wireless Interference: Analog Network Coding", retrieved on Jun. 19, 2009 at <<http://nms.lcs.mit.edu/~dina/pub/anc.pdf>>, SIGCOMM 2007, ACM 2007, 12 pages.
Lin, et al., "SODA: A Low-power Architecture for Software Radio", retrieved on Jun. 19, 2009 at <<http://ieeexplore.ieee.org/stamp/stamp.jsp?tp=&arnumber=1635943>>, Proceedings of the 33rd International Symposium on Computer Architecture (ISCA 2006), IEEE, 2006.
Lin, et al., "Software Defined Radio—A High Performance Challenge", retrieved on Jun. 19, 2009 at <<http://citeseerx.ist.psu.edu/viewdoc/download?doi=10.1.1.92.7327&rep=rep1&type=pdf>>, SDRG, pp. 1-41.
MADWIFI, retrieved on Jun. 19, 2009 at <<http://sourceforge.net/projects/madwifi>>, 1 page.
Minden, et al., "KUAR: A Flexible Software-Defined Radio Development Platform", retrieved on Jun. 19, 2009 at <<http://www.ittc.ku.edu/publications/documents/minden2007_dyspan07.pdf>>, 12 pages.
Neel, et al., "A Formal Methodology for Estimating the Feasible Processor Solution Space for a Software Radio", retrieved on Jun. 19, 2009 at <<http://www.sdrforum.org/pages/sdr05/1.2%20Reconfigurable%20Hardware/1.2-03%20Neel%20et%20al.pdf>>, Proceeding of the SDR 2005 Technical Conference and Product Exposition, SDR, 2005, 6 pages.
Neufeld, et al., "SoftMAC—Flexible Wireless Research Platform", retrieved on Jun. 19, 2009 at <<http://conferences.sigcomm.org/hotnets/2005/papers/grunwald.pdf>>, Department of Computer Science, University of Colorado, Boulder, Nov. 4, 2005, pp. 1-6.
"Part 11: Wireless LAN Medium Access Control (MAC) and Physical Layer (PHY) Specifications", retrieved on Jun. 19, 2009 at <<http://www.csse.uwa.edu.au/adhocnets/802.11-1999.pdf>>, ANSI/IEEE Std 802.11, 1999 Edition, pp. i-xiv and 1-512.
"Rt2x00", retrieved on Jun. 19, 2009 at <<http://rt2x00.serialmonkey.com>>, Apr. 12, 2009, 3 pages.
Schmid, et al., "An Experimental Study of Network Performance Impact of Increased Latency in Software Defined Radios", retrieved on Jun. 19, 2009 at <<http://nesl.ee.ucla.edu/fw/thomas/wintech401-schmid.pdf>>, WiNTECH 2007, Networked and Embedded Systems Laboratory, Electrical Engineering Department, University of California, Los Angeles, 8 pages.
"Small Form Factor SDR Development Platform", retrieved on Jun. 19, 2009 at <<http://www.kanecomputing.co.uk/lyrtech_sff_sdr_dev_platform.htm>>, Kane Computing Ltd., 2 pages.
"Software-Defined Radio System", retrieved on Jun. 19, 2009 at <<http://zone.ni.com/devzone/cda/tut/p/id/8787>>, National Instruments, May 26, 2009, pp. 1-5.
Tennenhouse, et al., "SpectrumWare—A Software-Oriented Approach to Wireless Signal Processing", retrieved on Jun. 19, 2009 at <<http://citeseerx.ist.psu.edu/viewdoc/download;jsessionid=D99E57C2A2A3CEEF89F66CBA544F774F?doi=10.1.1.17.9618&rep=rep1&type=pdf>>, Telemedia Networks and Systems Group Laboratory for Computer Science, MIT, pp. 1-15.
"The Kill Rule for Multicore", retrieved on Jun. 19, 2009 at <<http://ieeexplore.ieee.org/stamp/stamp.jsp?arnumber=04261283>>, DAC 2007, ACM 2007, pp. 750-753.
Tsou, et al., "Latency Profiling for SCA Software Radio", retrieved on Jun. 19, 2009 at <<http://www.sdrforum.org/pages/sdr07/Proceedings/Papers/2.2/2.2-1.pdf>>, SDR Forum Technical Conference 2007, 6 pages.
Verdu, "Multiuser Detection", retrieved on Jun. 19, 2009 at <<http://www.cambridge.org/US/catalogue/catalogue.asp?isbn=0521593735>>, Aug. 1998, 2 pages.
"WARP: Wireless Open Access Research Platform", retrieved on Jun. 19, 2009 at <<http://warp.rice.edu/trac>>, Rice University, 2 pages.
Advanced Concept Engineering Corp., "Ultra High-Performance Viterbi Decoder Core ACIP Viterbi_K7-", retrieved at <<http://www.acengr.com/datasheet/ACIP_Viterbi_DataSheet.pdf>> on Aug. 11, 2009.
Arslan, "Teaching SDR through a Laboratory Based Course with Modern Measurement and Test Instruments", published Nov. 5-9, 2007, retrieved from the internet at <<http://www.sdrforum.org/pages/sdr07/Proceedings/Papers/1.2/1.2-3.pdf.
"Waveform Creator has Object-Oriented GUI Optimized for MIMO", Published Jun. 30, 2008, retrieved from the internet at <<http://news.thomasnet.com/fullstory/545867>>.
"Think Beyond the Box—A Software-Defined Approach to RF Test", Published May 13, 2009, retrieved from the internet at <<http://zone.ni.com/devzone/cda/pub/p/id/750>>.
Savvopoulos, et al., "A Software-Radio Test-bed for Measuring the Performance of DVB-S2 Receiver Circuits", published Oct. 6-8, 2008.
"GAO USB PC Based Oscilloscope (1Mega) Model A0130005", Copyright 2001-2009, retrieved from the internet at <<http://www.gaoinstruments.com/gao2902_usb_pc_based_oscilloscope_1mega-p-53.html>>.
Wu, et al., "A Novel Software Radio Platform Based on General PC and Network", 2006 IEEE, Published 2006, retrieved from the internet at <<http://ieeexplore.ieee.org/stamp/stamp.jsp?arnumber=04149565>>.
Dong et al., "Neural Networks Based Parallel Viterbi Decoder by Hybrid Design", Proceeding of the 5th World Congress on Intelligent Control and Automation, Jun. 15-19, 2004, pp.#1923-pp.#1926.
Kim et al., "Low Power, High-Rate Viterbi Decoder Employing the SST (Scarce State Transition) Scheme and Radix-4 Trellis" Department of Electrical and Computer Engineering, Sungkyunkwan University, Feb. 2000, pp.#1-pp.#4.
Kim et al., "Power Efficient Viterbi Decoder based on Pre-computation Technique for Portable Digital Multimedia Broadcasting Receiver", IEEE Transactions on Consumer Electronics, vol. 53, No. 2, May 2007, pp#350-pp#356.
Siu et al., "A Robust Viterbi Algorithm against Impulsive Noise with Application to Speech Recognition", IEEE Transactions on Audio, Speech, and Language Processing, vol. 14, No. 6, Nov. 2006, pp.#2122-pp.#2133.
Burton, "16-Channel, DDS LVDS Interface with Per-Channel Alignment", retrieved on Aug. 13, 2009 at <<http://www.xilinx.com/support/documentation/application_notes/xapp855.pdf>>, XILINX, Application Note: Virtex-5 FPGAs, XAPP855, Oct. 13, 2006, pp. 1-43.
Sawyer, "High-Speed Data Serialization and Deserialization (840 Mb/s LVDS)", retrieved on Aug. 13, 2009 at <<http://www.eetindia.coin/ARTICLES/2002JUN/2002JUN28_AMD_NTEK_AN.PDF?SOURCES=DOWNLOAD>>, XILINX, Application Note: Virtex-II Family, XAPP265, Jun. 19, 2002, pp. 1-13.
"LVDS-Based SerDes for Video Interconnects", retrieved on Aug. 13, 2009 at <<http://www.epn-online.com/page/new51279>>, EPN, Electronic Product News, pp. 1-11.

(56) References Cited

OTHER PUBLICATIONS

Lin, et al., "IBM Research Report Wireless Base Station Design on General Purpose Processor with Multicore Technology", retrieved on Aug. 13, 2009 at <<http://domino.watson.ibm.com/library/cyberdig.nsf/papers/B4C36233C8280F27852575FD005991DF/$File/rc24823.pdf>>, IBM Research Division, China Research Laboratory, Electrical Engineering, RC24823, Jul. 14, 2009, 9 pages.

Tan, et al., "Sora: High Performance Software Radio Using General Purpose Multi-Core Processors", retrieved on Aug. 13, 2009 at <<http://www.usenix.org/event/nsdi09/tech/slides/tan.pdf>>, NSDI, 2009, pp. 1-27.

"Using Flexible-LVDS I/O Pins in APEX II Devices", retrieved on Aug. 13, 2009 at <<http://www.altera.com/literature/an/an167.pdf>>, Altera Corporation, Application Note 167, ver 1.1, Aug. 2002, pp. 1-14.

8b/10b encoding, accessed on Apr. 21, 2011 <http://en.wikipedia.org/wiki/8b/10B>, 9 pages.

Ethernet Frame, accessed on Apr. 21, 2011, <http://en.wikipedia.org/wiki/Ethernet_frame>, 6 pages.

Final Office Action for U.S. Appl. No 12/473,963, mailed on May 1, 2012, Ranveer Chandra, "Spectrum Assignment for Networks Over White Spaces and Other Portions of the Spectrum", 14 pgs.

"Low-Voltage differential signaling", accessed on Apr. 21, 2011 <http://en.wikipedia.org/wiki/Low-voltage_differential_signaling>, 7 pages.

Ma, "A Closter Look at LVDS Technology" Pericom, Application Note 41, Nov. 16, 2001. 3 pages.

Office Action for U.S. Appl. No. 12/631,548, mailed on Jan. 10, 2012, Kun Tan, "Analyzing Wireless Technologies Based on Software-Defined Radio", 8 pgs.

Office Action for U.S. Appl. No. 12/473,963, mailed on Nov. 9, 2011, Ranveer Chandra, "Spectrum Assignment for Networks Over White Spaces and Other Portions of the Spectrum", 12 pgs.

Office Action for U.S. Appl. No. 12/630,774, mailed on Apr. 12, 2012, Kun Tan, "High Performance Digital Signal Processing in Software Radios", 9 pgs.

Office action for U.S. Appl. No. 12/571,188, mailed on Jun. 6, 2012, Tan et al., "Radio Control Board for Software-Defined Radio Platform", 18 pages.

Office action for U.S. Appl. No. 12/631,548, mailed on Jul. 2, 2012, Tan et al., "Analyzing Wireless Technologies Based on Software-Defined Radio", 7 pages.

PCT International Search Report and Written Opinion for PCT Application No. PCT/US2010/036752 mailed Dec. 31, 2010, 9 pgs.

PCT International Search Report and Written Opinion for PCT Application No. PCT/US2010/036756 mailed Dec. 29, 2010, 9 pgs.

System Packet Interface Level 4 (SPI-4) Phase 2 Revision 1: OC-192 System Interface for Physical and Link Layer Devices, Optical Internetworkig Forum, Oct. 15, 2003, 72 pages.

Alocci et al., "Development of an IEEE 802.11s Simulation Model for QualNet", Dublin, Ireland, retrieved at http://www.csi.ucd.ie/Staff/jmurphy/publications/1551.pdf, Sep. 2008, 9 pages.

"Authorized Ex Parte Contact—Unlicensed Operation in the TV Broadcast Bands, FCC.", Retrieved at << http://hraunfoss.fcc.gov/edocs_public/attachmatch /DA-04-4013A1.pdf >>, Dec. 22, 2004, pp. 2.

Bhatt, "Creating a PCI Express Interconnect", Intel Corporation, 2002, 8 pages.

Borth et al., "Considerations for Successful Cognitive Radio Systems in US TV White Space", Proceedings of the 3rd IEEE Symposium on New Frontiers in Dynamic Spectrum Access Networks, Oct. 14-17, 2008, 5 pages.

Broch et al., "A Performance Comparison of Multi-Hop Wireless Ad Hoc Network Routing Protocols", International Conference on Mobile Computing and Networking, Proceedings of the 4th annual ACM/IEEE international conference on Mobile computing and networking, Oct. 25-30, 1998, pp. 85-97.

Cabric et al., "Experimental Study of Spectrum Sensing Based on Energy Detection and Network Cooperation", Proceedings of the First International Workshop on Technology and Policy for Accessing Spectrum, 2006, 8 pages.

Chandra et al., "Wireless Networking in the TV Bands", retrieved at http://sdr08.cs.ucdavis.edu/sdr-workshop.ppt, Apr. 1, 2009, 34 pages.

Chu, et al., "A Case for End System Multicast", Proceedings of the 2000 ACM SIGMETRICS International Conference. 28, Issue 1, Jun. 2000, pp. 1-12.

"Cognitive Radio Networks", retrieved at http://www.ece.gatech.edu/research/labs/bwn/CR/Projectdescription.html, Apr. 1, 2009, 13 pages.

Dandawate, et al., "Statistical Tests for Presence of Cyclostationarity", IEEE Transactions on Signal Processing, vol. 42, No. 9, Sep. 1994, pp. 2355-2369.

Deb et al., "Dynamic Spectrum Access in DTV Whitespaces Design Rules, Architecture and Algorithms", ACM 978-1-60558-702-8/09/09, MobiCom '09, Sep. 20-25, 2009, 12 pages.

Web page for Ettus Research LLC, "The USRP Product Family", Mountain View, California, retrieved at<<http://www.ettus.com>>, retrieved on Mar. 31, 2009, 2 pages.

Ettus Research LLC, "USRP FAQ", Mountain View, California, retrieved at <<http://www.ettus.com/faq.html>>, retrieved on Mar. 31, 2009, 7 pages.

"FCC Adopts Rules for Unlicensed Use of Television White Spaces", news release from the Federal Communications Commission, Nov. 4, 2008, 2 pages.

FCC Media Bureau, "TVQ TV Database", Retrieved at: <<http://www.fcc.gov/mb/video/tvq. html>>, Dec. 24, 2009, 2 pages.

"FCC Acts to Expedite DTV Transition and Clarify DTV Build-Out Rules", news release from the Federal Communications Commission, Nov. 8, 2001, retrieved at http://www.fcc.gov/Bureaus/Mass_Media/News_Releases/2001/nrmm0114.html, 3 pages.

Garroppo et al., "Notes on Implementing a IEEE 802.11s Mesh Point" retrieved at http://recerca.ac.upc.edu/eurongi08/slides/6-1-s.pdf, Apr. 1, 2009, 39 pages.

Goldsmith, Andrea Jo, "Design and Performance of High-Speed Communication Systems over Time-Varying Radio Channels", UC Berkeley, Berkeley, California, 1994, 210 pages.

Gurney et al., Geo-location Database Techniques for Incumbent Protection in the TV White Space, IEEE, 978-1-4244-2017-9/08, Jun. 6, 2008, 9 pages.

"IEEE 802.22 Working Group on WRANs" web page for IEEE 802 LAN/MAN Standards Committee, retrieved at <<http://www.ieee802.org/22/>>, retrieved on Mar. 31, 2009, 2 pages.

"Demonstrations and Experimentation", IEEE Symposia on New Frontiers in Dynamic Spectrum Access Networks, http://cms.comsoc.org/eprise/main/SiteGen/DYSPAN_2008/ Content/Home/demonstrations.html, retrieved Mar. 31, 2009, 13 pages.

Jones, et al., "FCC Press Release, Evaluation of the Performance of Prototype TV-Band White Space Devices", Retrieved at << http://online.wsj.com/public/resources/documents/ fcc10152008.pdf >>, Oct. 15, 2008, pp. 149.

Katabi, Dina, "The Use of IP Anycast for Building Efficient Multicast", Proceedings in Global Telecommunications Conference, Lab. for Computer Science, vol. 3, Dec. 5-9, 1999, pp. 1679-1688.

Kim et al., "Fast Discovery of Spectrum Opportunities in Cognitive Radio Networks", Proceedings of the 3rd IEEE Symposium on New Frontiers in Dynamic Spectrum Access Networks, Oct. 14-17, 2008, retrieved at <<http:// kabru.eecs.umich.edu//papers/ publications/2008/main.pdf>>, 12 pages.

Kim, et al., "In-band Spectrum Sensing in Cognitive Radio Networks: Energy Detection or Feature Detection?", Proceedings of the 14th ACM international conference on Mobile computing and networking, Sep. 14-19, 2008, pp. 14-25.

Liu, et al., "Sensing-based Opportunistic Channel Access", Mobile Networks and Applications, vol. 11, No. 4, Aug. 2006, pp. 1-28.

"Longley-Rice Methodology for Evaluating TV Coverage and Interference.", Retrieved at <<http://www.fcc.gov/Bureaus/Engineering_Technology/Documents/bulletins/oet69/oet69 .pdf >>, Feb. 6, 2004, pp. 15.

(56) References Cited

OTHER PUBLICATIONS

Matinmikko, et al., "Cognitive Radio: An intelligent Wireless Communication System", Retrieved at << http://www.vtt.fi/inf/julkaisut/muut/2008/CHESS_Research_Report.pdf >>, Mar. 14, 2008, pp. 155.

Mishra et al., "How much white space is there?", Technical Report No. UCB/EEECS-2009-3, Jan. 11, 2009, 16 pages.

Moscibroda et al., "Load-Aware Spectrum Distribution in Wireless LANs", IEEE International Conference on Network Protocols, Oct. 19-22, 2008, retrieved at <<http://www.ieee-icnp.org/2008/papers/Indexl4.pdf>>, pp. 137-146.

Nekovee, Maziar., "Quantifying the TV White Spaces Spectrum Opportunity for Cognitive Radio Access", Retrieved at << www.springerlink.com/index/p1hrw58u75027542.pdf >>, First International ICST Conference, EuropeComm, Aug. 11-13, 2009, pp. 46-57.

National Geophysical Data Center, "The Global Land One-Km Base Elevation Project (GLOBE),", Retrieved at <<http://www. ngdc.noaa.gov/mgg/topo/globe.html >>, Retrieved Date: Dec. 24, 2009, pp. 2.

NYCwireless Testimony for NY City Council Hearing: The Regulation and Use of the Unallocated Portion of the Radio Spectrum, Also Known as White Spaces http://www.nycwireless.net/2008/09/nycwireless-testimony-for-ny-city-council-hearing-the-regulation-and-use-of-the-unallocated-portion-of-the-radio-spectrum-also-known-as-white-spaces/, Mar. 30, 2009, 3 pages.

Office action for U.S. Appl. No. 12/571,188, mailed on Oct. 25, 2012, Tan et al., "Radio Control Board for Software-Defined Radio Platform", 24 pages.

Office action for U.S. Appl. No. 12/630,774, mailed on Oct. 9, 2012, Tan et al., "High Performance Digital Signal Processing in Software Radios", 6 pages.

Otsason et al., "Accurate GSM Indoor Localization", UbiComp Sep. 11-14, 2005, LNCS vol. 3660, 2005, pp. 141-158.

PCT International Search Report and Written Opinion for PCT Application No. PCT/US2011/041302, mailed Dec. 28, 2011, 9 pgs.

Plummer Jr., et al., "A Cognitive Spectrum Assignment Protocol Using Distributed Conflict Graph Construction", In Proceedings IEEE MILCOM, Oct. 2007, 7 pages.

Radio Magazine, "FCC Adopts Rules for Unlicensed Use of Television White Spaces", Retrieved at <<http://radiomagonline.com/currents/news/fcc-adopts-rules-unlicensed-white-spaces-1105/>>, Nov. 5, 2008, pp. 4.

Ratnasamy et al., "Revisiting IP Multicast", ACM, 1-59593-308-5/06/0009, SigComm '06, Sep. 11-15, 2006, 12 pages.

Rix et al., "Perceptual Evaluation of Speech Quality (PESQ)—A New Method for Speech Quality Assessment of Telephone Networks and Codecs", Proceedings of the 2001 IEEE International Conference Acoustics, Speech and Signal Processing, vol. 2, 2001, 4 pages.

Rosum Corporation, "Reliable, In-Building", Retrieved at << http://rosum.com/ >>, Retrieved Date: Dec. 24, 2009, pp. 1.

Sahai et al., Spectrum Sensing Fundamental Limits and Practical Challenges, Retrieved at: << http://www.eecs.berkeley.edu/~sahai/Presentations/Dyspan_2005_tutorial_part_1.pdf, 2005, 138 pages.

Web page for Scalable Network Technologies, Inc., Los Angeles, California, retrieved at << http://www.scalable-networks.com>>, retrieved on Mar. 31, 2009, 1 page.

Shellhammer et al., "Technical Challenges for Cognitive Radio in the TV White Space Spectrum", ITA Conference, San Diego, CA, Feb. 8-13, 2009, 11 pages.

"Show My White Space", Retrieved at << http://showmywhitespace.com/ >>, Retrieved Date: Dec. 24, 2009, pp. 2.

"Shuttle Radar Topography Mission (SRTM)", Retrieved at << http://www2.jpl.nasa.gov/srtm/ >>, Retrieved Date: Dec. 24, 2009, pp. 2.

"Skyhook Wireless", Retrieved at << http://skyhookwireless.com/ >>, Retrieved Date: Dec. 24, 2009, pp. 6.

Stirling, "White Spaces—the New Wi-Fi?", Retrieved at << http://www.intellectbooks.co.uk/File:download,id=761/JDTV.1.1.69.pdf >>, International Journal of Digital Television, vol. 1, No. 1, 2010, pp. 16.

Subramani, et al., "Spectrum Scanning and Reserve Channel Methods for Link Maintenance in Cognitive Radio Systems", Proceedings of the 67th IEEE Vehicular Technology Conference, VTC, May 11-14, 2008, pp. 1944-1948.

Tandra et al., "SNR Wall for Signal Detection", IEEE Journal of Selected Topics in Signal Processing, vol. 2, No. 1, Feb. 2008, pp. 4-17.

Texas Instruments, "Texas Instruments, 10-MHz to 66-MHz, 10:1 LVDS Serializer/Deserializer", <http://www.ti.com>, 2004, 29 pages.

"The ITS Irregular Terrain Model Algorithm, NTIA, Department of Commerce.", Retrieved at << http://flattop.its.bldrdoc.gov/itm.html >>, Retrieved Date: Dec. 24, 2009, pp. 2.

Web page for "TV Fool", retrieved at http://www.tvfool.com, retrieved on Mar. 31, 2009, 4 pages.

Urkowitz, "Energy Detection of Unknown Deterministic Signals", Proceedings of the IEEE, vol. 55, No. 4, Apr. 1967, pp. 523-531.

Whitt, Richard., "Introducing the White Spaces Database Group", Retrieved at <<http:// googlepublicpolicy.blogspot.com/2009/02/introducing-white-spaces-database-group.html >>, Feb. 4, 2009, pp. 4.

Yuan, et al., "KNOWS: Kognitiv Networking Over White Spaces", IEEE Dynamic Spectrum Access Networks (DySPAN), Apr. 2007, pp. 12.

Kotz, et al., "Analysis of a Campus-wide Wireless Network", In Proceedings of the Eighth Annual International Conference on Mobile Computing and Networking, MOBICOM'02, Sep. 2002, Revised and corrected as Dartmouth CS Technical Report TR2002-432, 12 pages.

* cited by examiner

| Algorithm | Configuration | I/O Size (bit) Input | I/O Size (bit) Output | Optimization Method | Computation Required (Mcycles/sec) Conv. Impl. | Computation Required (Mcycles/sec) SDR Impl. | Speedup |
|---|---|---|---|---|---|---|---|
| IEEE 802.11b | | | | | | | |
| Scramble | 11Mbps | 8 | 8 | LUT | 96.54 | 10.82 | 8.9x |
| Descramble | 11Mbps | 8 | 8 | LUT | 95.23 | 5.91 | 16.1x |
| Mapping and Spreading | 2Mbps, DQPSK | 8 | 44*16*2 | LUT | 128.59 | 73.92 | 1.7x |
| CCK modulator | 5Mbps, CCK | 8 | 8*16*2 | LUT | 124.93 | 81.29 | 1.5x |
| | 11Mbps, CCK | 8 | 8*16*2 | LUT | 203.96 | 110.88 | 1.8x |
| FIR Filter | 16-bit I/Q, 37 taps, 22MSps | 16*2*4 | 16*2*4 | SIMD | 5,780.34 | 616.41 | 9.4x |
| Decimation | 16-bit I/Q, 4x Oversample | 16*2*4*4 | 16*2*4 | SIMD | 422.45 | 198.72 | 2.1x |
| IEEE 802.11a | | | | | | | |
| FFT/IFFT | 64 points | 64*16*2 | 64*16*2 | SIMD | 754.11 | 459.52 | 1.6x |
| Conv. Encoder | 24Mbps, 1/2 rate | 8 | 16 | LUT | 406.08 | 18.15 | 22.4x |
| | 48Mbps, 2/3 rate | 16 | 24 | LUT | 688.55 | 37.21 | 18.5x |
| | 54Mbps, 3/4 rate | 24 | 32 | LUT | 712.10 | 56.23 | 12.7x |
| Viterbi | 24Mbps, 1/2 rate | 8*16 | 8 | SIMD+LUT | 68,553.57 | 1,408.93 | 48.7x |
| | 48Mbps, 2/3 rate | 8*24 | 16 | SIMD+LUT | 117,199.6 | 2,422.04 | 48.4x |
| | 54Mbps, 3/4 rate | 8*32 | 24 | SIMD+LUT | 131,017.9 | 2,573.85 | 50.9x |
| Soft demapper | 24Mbps, QAM 16 | 16*2 | 8*4 | LUT | 115.05 | 46.55 | 2.5x |
| | 54Mbps, QAM 64 | 16*2 | 8*6 | LUT | 255.86 | 98.75 | 2.4x |
| Scramble & Descramble | 54Mbps | 8 | 8 | LUT | 547.86 | 40.29 | 13.6x |

Fig. 6A

PROCESS CARRIED OUT BY CONSUMER

SOFTWARE-DEFINED RADIO USING MULTI-CORE PROCESSOR

BACKGROUND

Software-defined radio (SDR) holds the promise of fully programmable wireless communication systems, effectively supplanting conventional radio technologies, which typically have the lowest communication layers implemented primarily in fixed, custom hardware circuits. Realizing the promise of SDR in practice, however, has presented developers with a dilemma. Many current SDR platforms are based on either programmable hardware such as field programmable gate arrays (FPGAs) or embedded digital signal processors (DSPs). Such hardware platforms can meet the processing and timing requirements of modem high-speed wireless protocols, but programming FPGAs and specialized DSPs can be a difficult task. For example, developers have to learn how to program each particular embedded architecture, often without the support of a rich development environment of programming and debugging tools. Additionally, such specialized hardware platforms can also be expensive, e.g., at least several times the cost of an SDR platform based on a general-purpose processor (GPP) architecture, such as a general-purpose Personal Computer (PC).

On the other hand, SDR platforms that use general-purpose PCs enable developers to use a familiar architecture and environment having numerous sophisticated programming and debugging tools available. Furthermore, using a general-purpose PC as the basis of an SDR platform is relatively inexpensive when compared with SDR platforms that use specialized hardware. However, the SDR platforms that use a general purpose PC typically have an opposite set of tradeoffs from the specialized architectures discussed above. For example, since PC hardware and software have not been specially designed for wireless signal processing, conventional PC-based SDR platforms can achieve only limited performance. For instance, some conventional PC-based SDR platforms typically achieve only a few Kbps throughput on an 8 MHz channel, whereas modern high-speed wireless protocols such as 802.11 support multiple Mbps data rates on a much wider 20 MHz channel. Thus, these performance constraints prevent developers from using PC-based SDR platforms to achieve the full fidelity of state-of-the-art wireless protocols while using standard operating systems and applications in a real-world environment.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Some implementations of an SDR disclosed herein use hardware and software techniques to address the challenges of using general-purpose computing device architectures for providing a high-speed SDR and SDR platform.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

FIG. 6A illustrates an algorithm optimization table according to some implementations.

DETAILED DESCRIPTION

Overview

Figure 1:
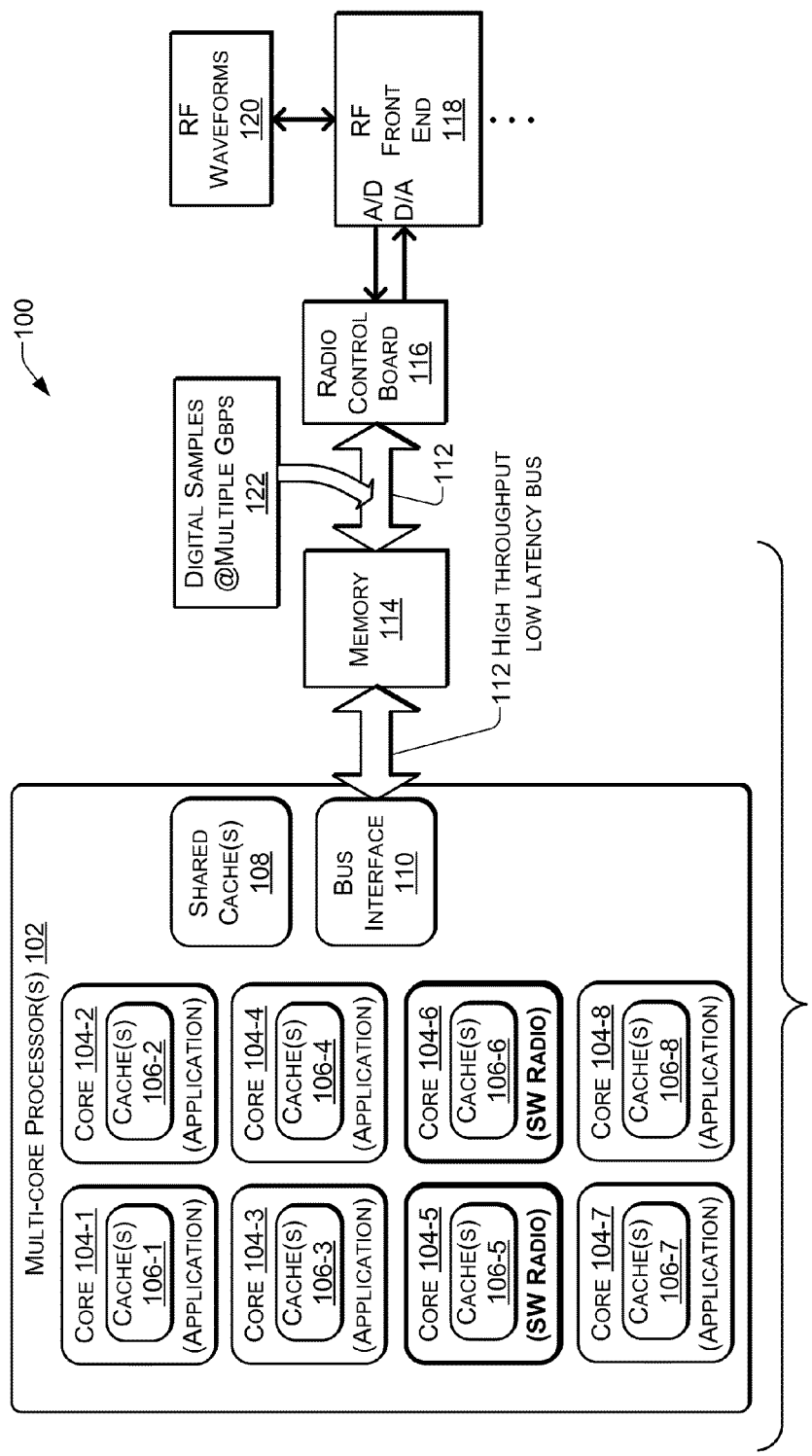
FIG. 1 illustrates an exemplary architecture according to some implementations disclosed herein.

Implementations disclosed herein present a fully programmable software-defined radio (SDR) platform and system able to be implemented on general-purpose computing devices, including personal computer (PC) architectures. Implementations of the SDR herein combine the performance and fidelity of specialized-hardware-based SDR platforms with the programmability and flexibility of general-purpose processor (GPP) SDR platforms. Implementations of the SDR herein use both hardware and software techniques to address the challenges of using general-purpose computing device architectures for high-speed SDR platforms. In some implementations of the SDR herein, hardware components include a radio front end for radio frequency (RF) reception and transmission, and a radio control board for high-throughput and low-latency data transfer between the radio front end and a memory and processor on the computing device.

Implementations of the SDR herein make use of features of multi-core processor architectures to accelerate wireless protocol processing and satisfy protocol-timing requirements. For example, implementations herein may use dedicated CPU cores, lookup tables stored in large low-latency caches, and SIMD (Single Instruction Multiple Data) processor extensions for carrying out highly efficient physical layer processing on general-purpose multiple-core processors. Some exemplary implementations described herein include an SDR that seamlessly interoperates with commercial 802.11a/b/g network interface controllers (NICs), and achieve performance that is equivalent to that of commercial NICs at multiple different modulations.

Furthermore, some implementations are directed to a fully programmable software radio platform and system that provides the high performance of specialized SDR architectures on a general-purpose computing device, thereby resolving the SDR platform dilemma for developers. Using implementations of the SDR herein, developers can implement and experiment with high-speed wireless protocol stacks, e.g., IEEE 802.11a/b/g/n, using general-purpose computing devices. For example, using implementations herein, developers are able to program in familiar programming environments with powerful programming and debugging tools on standard operating systems. Software radios implemented on the SDR herein may appear like any other network device, and users are able to run unmodified applications on the software radios herein while achieving performance similar to commodity hardware radio devices.

Furthermore, implementations of the SDR herein use both hardware and software techniques to address the challenges of using general-purpose computing device architectures for achieving a high-speed SDR. Implementations are further directed to an inexpensive radio control board (RCB) coupled with a radio frequency (RF) front end for transmission and reception. The RCB bridges the RF front end with memory of the computing device over a high-speed and low-latency PCIe (Peripheral Component Interconnect Express) bus. By using a PCIe bus, some implementations of the RCB can support 16.7 Gbps throughput (e.g., in PCIe x8 mode) with sub-microsecond latency, which together satisfies the throughput and timing requirements of modern wireless protocols, while performing all digital signal processing using the processor and memory of a general purpose computing device. Further, while examples herein use PCIe protocol, other high-bandwidth protocols may alternatively be used, such as, for example, HyperTransport™ protocol.

Additionally, to meet physical layer (PHY) processing requirements, implementations of the SDR herein leverage various features of multi-core architectures in commonly available general-purpose processors. Implementations of the SDR herein also include a software arrangement that explicitly supports streamlined processing to enable components of a signal-processing pipeline to efficiently span multiple cores. For example, implementations herein change the conventional implementation of PHY components to extensively take advantage of lookup tables (LUTs), thereby trading off memory in place of computation, which results in reduced processing time and increased performance. For instance, implementations herein substantially reduce the computational requirements of PHY processing by utilizing large, low-latency caches available on conventional GPPs to store the LUTs that have been previously computed. In addition, implementations of the SDR herein use SIMD (Single Instruction Multiple Data) extensions in existing processors to further accelerate PHY processing. Furthermore, to meet the real-time requirements of high-speed wireless protocols, implementations of the SDR herein provide a new kernel service, core dedication, which allocates processor cores exclusively for real-time SDR tasks. The core dedication can be used to guarantee the computational resources and precise timing control necessary for SDR on a general-purpose computing device. Thus, implementations of the SDR herein are able fully support the complete digital processing of high-speed radio protocols, such as 802.11a/b/g/n, CDMA, GSM, WiMax and various other radio protocols, while using a general purpose computing device. Further, it should be noted that while various radio protocols are discussed in the examples herein, the implementations herein are not limited to any particular radio protocol.

Architecture Implementations

FIG. 1 illustrates an exemplary architecture of an SDR platform and system 100 according to some implementations herein. The SDR platform and system 100 includes one or more multi-core processors 102 having a plurality of cores 104. In the illustrated implementation, multi-core processor 102 has eight cores 104-1, . . . , 104-8, but other implementations herein are not limited to any particular number of cores. Each core 104 includes one or more corresponding onboard local caches 106-1, . . . , 106-8 that are used by the corresponding core 104-1, . . . 104-8, respectively, during processing. Additionally, multi-core processor 102 may also include one or more shared caches 108 and a bus interface 110. Examples of suitable multi-core processors include the Xenon™ processor available from Intel Corporation of Santa Clara, Calif., USA, and the Phenom™ processor available from Advanced Micro Devices of Sunnyvale, Calif., USA, although implementations herein are not limited to any particular multi-core processor. In the example illustrated, two of the cores, cores 104-5 and 104-6 are performing processing for the SDR, while the remaining cores 104-1 through 104-4 and 104-7 through 104-8 are performing processing for other applications, the operating system, or the like, as will be described additionally below. Further, in some implementations, two or more multi-core processors 102 can be provided, and cores 104 across the two or more multi-core processors can be used for SDR processing.

Multi-core processor 102 is in communication via bus interface 110 with a high-throughput, low-latency bus 112, and thereby to a system memory 114. As mentioned above, bus 112 may be a PCIe bus or other suitable bus having a high data throughput with low latency. Further, bus 112 is also in communication with a radio control board (RCB) 116. As is discussed further below, radio control board 116 may be coupled to an interchangeable radio front end (RF front end) 118. The RF front end 118 is a hardware module that receives and/or transmits radio signals through an antenna (not shown in FIG. 1). In some implementations of the SDR architecture herein, the RF front end 118 represents a well-defined interface between the digital and analog domains. For example, in some implementations, RF front end 118 may contain analog-to-digital (A/D) and digital-to-analog (D/A) converters, and necessary circuitry for radio frequency transmission, as is discussed further below.

During receiving, the RF front end 118 acquires an analog RF waveform 120 from the antenna, possibly down-converts the waveform to a lower frequency, and then digitizes the analog waveform into discrete digital samples 122 before transferring the digital samples 122 to the RCB 116. During transmitting, the RF front end 118 accepts a synchronous stream of software-generated digital samples 122 from a software radio stack 124 (i.e., software that generates the digital samples, as discussed below), and synthesizes the corresponding analog waveform 120 before emitting the waveform 120 via the antenna. Since all signal processing is done in software on the multi-core processor 102, the design of RF front end 118 can be rather generic. For example, RF front end 118 can be implemented in a self-contained module with a standard interface to the RCB 116. Multiple wireless technologies defined on the same frequency band can use the same RF front end hardware 118. Furthermore, various different RF front ends 118 designed for different frequency bands can be coupled to radio control board 116 for enabling radio communication on various different frequency bands. Therefore, implementations herein are not limited to any particular frequency or wireless technology.

According to some implementations herein, RCB 116 is a PC interface board optimized for establishing a high-throughput, low-latency path for transferring high-fidelity digital signals between the RF front end 118 and memory 114. The interfaces and connections between the radio front end 118 and multi-core processor 102 must enable sufficiently high throughput to transfer high-fidelity digital waveforms. For instance, in order to support a 20 MHz channel for 802.11 protocol, the interfaces should sustain at least 1.28 Gbps. By way of comparison, conventional interfaces, such as USB 2.0 (≤480 Mbps) or Gigabit Ethernet (≤1 Gbps) are not able to meet this requirement. Accordingly, to achieve the required system throughput, some implementations of the RCB 116 use a high-speed, low-latency bus 112, such as PCIe. With a maximum throughput of 64 Gbps (e.g., PCIe x32) and sub-microsecond latency, PCIe is easily able to support multiple gigabit data rates for sending and receiving wireless signals over a very wide band or over many MIMO channels. Further, the PCIe interface is typically common in many conventional general-purpose computing devices.

A role of the RCB 116 is to act as a bridge between the synchronous data transmission at the RF front end 118 and the asynchronous processing on the processor 102. The RCB 116 implements various buffers and queues, together with a large onboard memory, to convert between synchronous and asynchronous streams and to smooth out bursty transfers between the RCB 116 and the system memory 114. The large onboard memory further allows caching of pre-computed waveforms for quick transmission of the waveforms, such as when acknowledging reception of a transmission, thereby adding additional flexibility for software radio processing.

Finally, the RCB 116 provides a low-latency control path for software to control the RF front end hardware 118 and to ensure that the RF front end 118 is properly synchronized with the processor 102. For example, wireless protocols have multiple real-time deadlines that need to be met. Consequently, not only is processing throughput a critical requirement, but the processing latency should also meet certain response deadlines. For example, some Media Access Control (MAC) protocols also require precise timing control at the granularity of microseconds to ensure certain actions occur at exactly pre-scheduled time points. The RCB 116 of implementations herein also provides for such low latency control. Additional details of implementations of the RCB 116 are described further below.

Exemplary Computing Device Implementation

Figure 2:
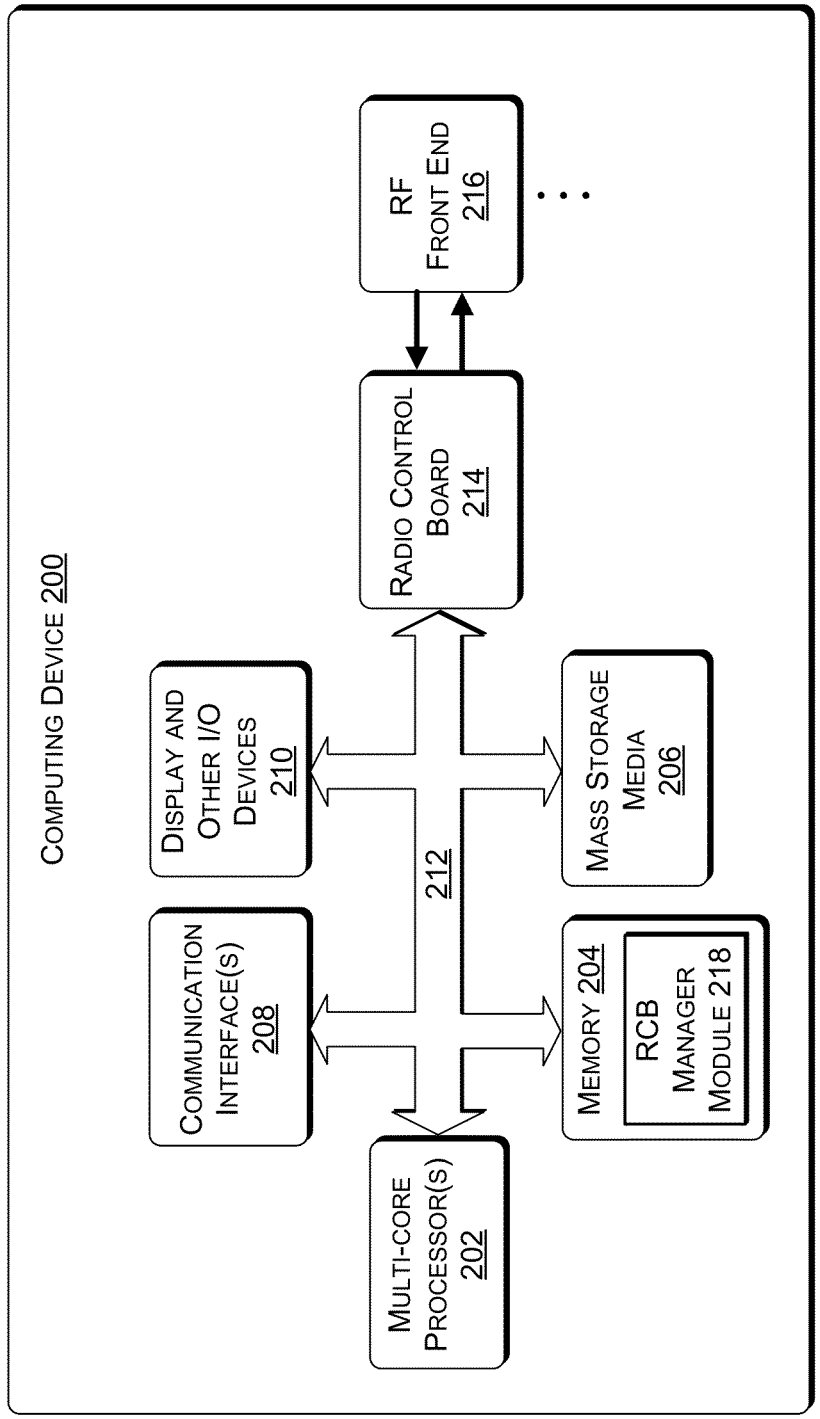
FIG. 2 illustrates an exemplary hardware and logical configuration of a computing device according to some implementations.

FIG. 2 illustrates an exemplary depiction of a computing device 200 that can be used to implement the SDR implementations described herein, such as the SDR platform and system 100 described above with reference to FIG. 1. The computing device 200 includes one or more multi-core processors 202, a memory 204, one or more mass storage devices or media 206, communication interfaces 208, and a display and other input/output (I/O) devices 210 in communication via a system bus 212. Memory 204 and mass storage media 206 are examples of computer-readable storage media able to store instructions which cause computing device 200 to perform the various functions described herein when executed by the processor(s) 202. For example, memory 204 may generally include both volatile memory and non-volatile memory (e.g., RAM, ROM, or the like). Further, mass storage media 206 may generally include hard disk drives, solid-state drives, removable media, including external and removable drives, memory cards, Flash memory, or the like. The computing device 200 can also include one or more communication interfaces 208 for exchanging data with other devices, such as via a network, direct connection, or the like, as discussed above. The display and other input/output devices 210 can include a specific output device for displaying information, such as a display, and various other devices that receive various inputs from a user and provide various outputs to the user, and can include, for example, a keyboard, a mouse, audio input/output devices, a printer, and so forth.

Computing device 200 further includes radio control board 214 and RF front end 216 for implementing the SDR herein. For example, system bus 212 may be a PCIe compatible bus, or other suitable high throughput, low latency bus. Radio control board 214 and RF front end 216 may correspond to radio control board 116 and RF front end 118 described above with reference to FIG. 1, and as also described below, such as with reference to FIG. 3. Furthermore, an RCB control module 218 may be stored in memory 204 or other computer-readable storage media for controlling operations on RCB 214, as is described additionally below. The computing device 200 described herein is only one example of a computing environment and is not intended to suggest any limitation as to the scope of use or functionality of the computer architectures that can implement the SDR herein. Neither should the computing device 200 be interpreted as having any dependency or requirement relating to any one or combination of components illustrated in the computing device 200.

Furthermore, implementations of SDR platform and system 100 described above can be employed in many different computing environments and devices for enabling a software-defined radio in addition to the example of computing device 200 illustrated in FIG. 2. Generally, many of the functions described with reference to the figures can be implemented using software, hardware (e.g., fixed logic circuitry), manual processing, or a combination of these implementations. The term "logic", "module" or "functionality" as used herein generally represents software, hardware, or a combination of software and hardware that can be configured to implement prescribed functions. For instance, in the case of a software implementation, the term "logic," "module," or "functionality" can represent program code (and/or declarative-type instructions) that perform specified tasks when executed on a processing device or devices (e.g., CPUs or processors). The program code can be stored in one or more computer readable memory devices, such as memory 204 and/or mass storage media 206, or other computer readable storage media. Thus, the methods and modules described herein may be implemented by a computer program product. The computer program product may include computer-readable media having a computer-readable program code embodied therein. The computer-readable program code may be adapted to be executed by one or more processors to implement the methods and/or modules of the implementations described herein. The terms "computer-readable storage media", "processor-accessible storage media", or the like, refer to any kind of machine storage medium for retaining information, including the various kinds of memory and storage devices discussed above.

Radio Control Board

Figure 3:
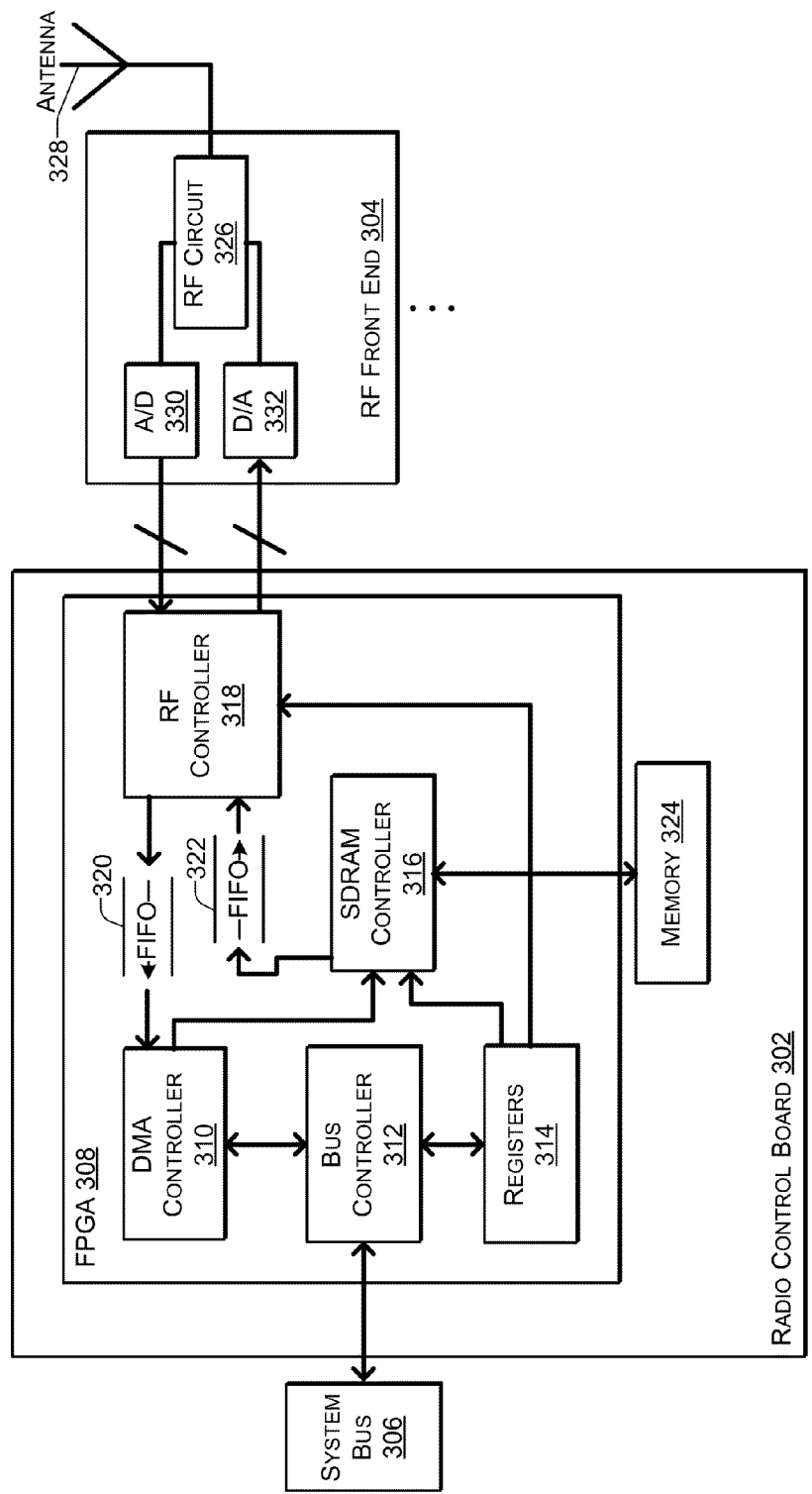
FIG. 3 illustrates a representation of an exemplary radio control board and RF front end according to some implementations.

FIG. 3 illustrates an exemplary implementation of a radio control board (RCB) 302 and RF front end 304, that may correspond to the RCB 116, 214 and RF front end 118, 216 described above. In the example illustrated, RCB 302 includes functionality for controlling the transfer of data between the RF front end 304 and a system bus 306, such as buses 112, 212 discussed above. In the illustrated embodiment, the functionality is a field-programmable gate array (FPGA) 308, which may be a Virtex-5 FPGA available from Xilinx, Inc., of San Jose, Calif., USA, one or more other suitable FPGAs, or other equivalent circuitry configured to accomplish the functions described herein. RCB 302 includes a direct memory access (DMA) controller 310, a bus controller 312, registers 314, an SDRAM controller 316, and an RF controller 318. RCB 302 further includes a first FIFO buffer 320 for acting as a first FIFO for temporarily storing digital samples received from RF front end 304, and a second FIFO buffer 322 for temporarily storing digital samples to be transferred to RF front end 304. The DMA controller 310 controls the transfer of received digital samples to the system bus 306 via the bus controller 312. SDRAM controller 316 controls the storage of data in onboard memory 324, such as digital samples, pre-generated waveforms, and the like. As an example only, memory 324 may consist of 256 MB of DDR2 SDRAM.

The RCB 302 can connect to various different RF front ends 304. One suitable such front end 304 is available from Rice University, Houston, Tex., USA, and is referred to as the Wireless Open-Access Research Platform (WARP) front end. The WARP front end is capable of transmitting and receiving a 20 MHz channel at 2.4 GHz or 5 GHz. In some implementations, RF front end 304 includes an RF circuit 326 configured as an RF transceiver for receiving radio waveforms from an antenna 328 and for transmitting radio waveforms via antenna 328. RF front end 304 further may include an analog-to-digital converter 330 and a digital-to-analog converter 332. As discussed above, analog-to-digital converter 330 converts received radio waveforms to digital samples for processing, while digital-to-analog converter 332 converts digital samples generated by the processor to radio waveforms for transmission by RF circuit 326. Furthermore, it should be noted that implementations herein are not limited to any particular front end 304, and in some implementations, the entire front end 304 may be incorporated into RCB 302. Alternatively, in other implementations, analog-to-digital converter 330 and digital-to-analog converter 332 may be incorporated into RCB 302, and RF front end 304 may merely have an RF circuit 326 and antenna 328. Other variations will also be apparent in view of the disclosure herein.

In the implementation illustrated in FIG. 3, the DMA controller 310 and bus controller 312 interface with the memory and processor on the computing device (not shown in FIG. 3) and transfer digital samples between the RCB 302 and the system memory on the computing device, such as memory 114, 204 discussed above. RCB software control module 218 discussed above with reference to FIG. 2 sends commands and reads RCB states through RCB registers 314. The RCB 302 further uses onboard memory 324 as well as small FIFO buffers 320, 322 on the FPGA 308 to bridge data streams between the processor on the computing device and the RF front end 304. When receiving radio waveforms, digital signal samples are buffered in on-chip FIFO buffer 320 and delivered into the system memory on the computing device when the digital samples fit in a DMA burst (e.g., 128 bytes). When transmitting radio waveforms, the large RCB memory 324 enables implementations of the RCB manager module 218 (e.g., FIG. 2) to first write the generated samples onto the RCB memory 324, and then trigger transmission with another command to the RCB. This functionality provides flexibility to the implementations of the SDR manager module 218 for pre-calculating and storing of digital samples corresponding to several waveforms before actually transmitting the waveforms, while allowing precise control of the timing of the waveform transmission.

It should be noted that in some implementations of the SDR herein, a consistency issue may be encountered in the interaction between operations carried out by DMA controller 310 and operations on the processor cache system. For example, when a DMA operation modifies a memory location that has been cached in the processor cache (e.g., L2 or L3 cache), the DMA operation does not invalidate the corresponding cache entry. Accordingly, when the processor reads that location, the processor might read an incorrect value from the cache. One naive solution is to disable cached accesses to memory regions used for DMA, but doing so will cause a significant degradation in memory access throughput.

Figure 4:
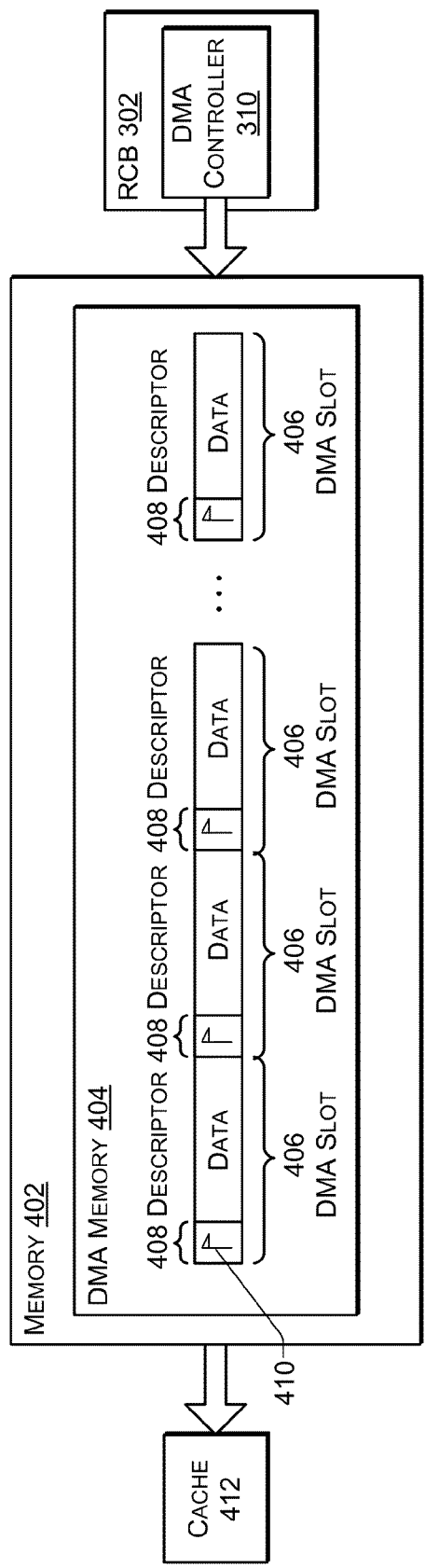
FIG. 4 illustrates exemplary DMA memory access according to some implementations.

As illustrated in FIG. 4, implementations herein address this issue by using a smart-fetch strategy, thereby enabling implementations of the SDR to maintain cache coherency with DMA memory without drastically sacrificing throughput. FIG. 4 illustrates a memory 402 which may correspond to system memory 114, 204 discussed above, and which includes a portion set aside as DMA memory 404 that can be directly accessed by DMA controller 310 on the RCB 302 for storing digital samples as data. In some implementations, the SDR organizes DMA memory 404 into small slots 406, whose size is a multiple of the size of a cache line. Each slot 406 begins with a descriptor 408 that contains a flag 410 or other indicator to indicate whether the data has been processed. The RCB 302 sets the flag 410 after DMA controller 310 writes a full slot of data to DMA memory 404. The flag 410 is cleared after the processor processes all data in the corresponding slot in the cache 412, which may correspond to caches 106 and/or 108 described above. When the processor moves to a cache location corresponding to a new slot 406, the processor first reads the descriptor of the slot 406, causing a whole cache line to be filled. If the flag 410 is set (e.g., a value of "1"), the data just fetched is valid and the processor can continue processing the data. Otherwise, if the flag is not set (e.g., a value of "0"), the DMA controller on the RCB has not updated this slot 406 with new data, and the processor explicitly flushes the cache line and repeats reading the same location. The next read refills the cache line, loading the most recent data from DMA memory 404. Accordingly, the foregoing process ensures that the processor does not read an incorrect value from the cache 412. Furthermore, while an exemplary RCB 302 has been illustrated and described, it will be apparent to those of skill in the art in light of the disclosure here in that various other implementations of the RCB 302 also fall within the scope of the disclosure herein.

SDR Software Implementations

Figure 5:
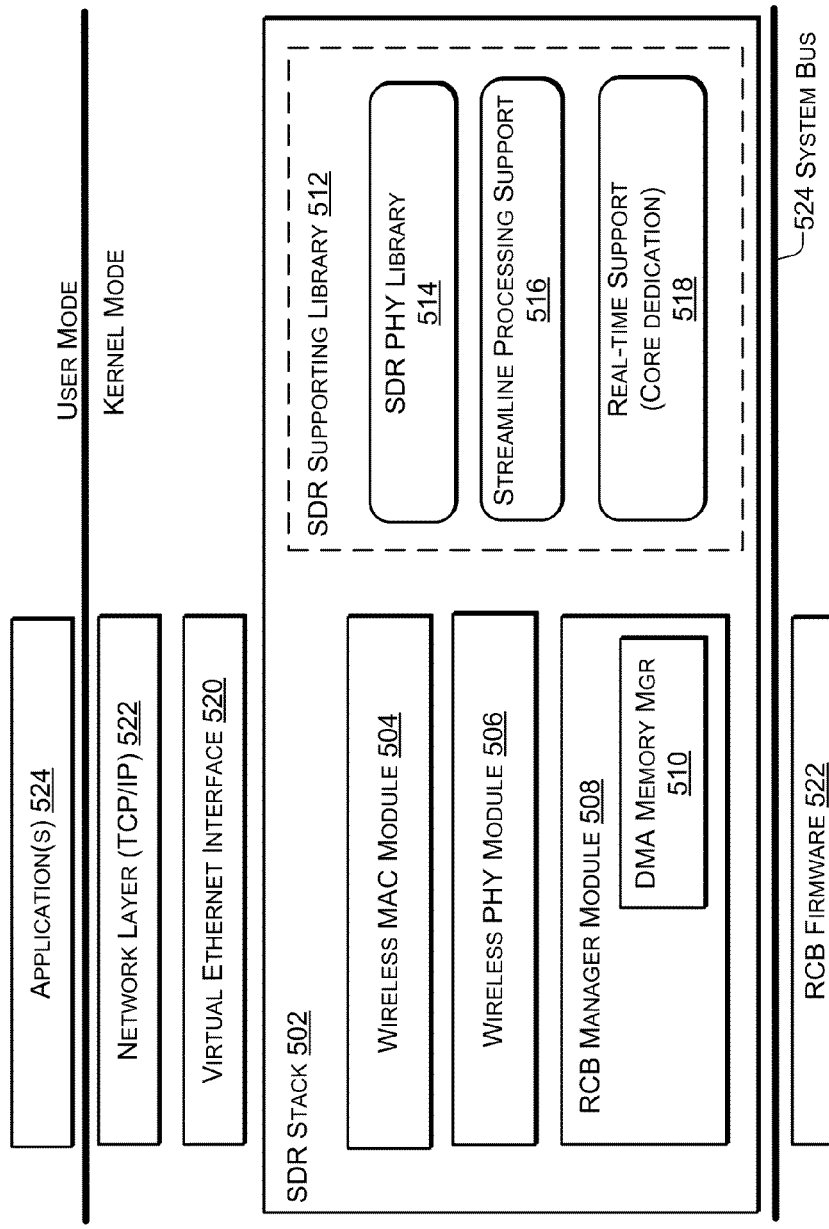
FIG. 5 illustrates an exemplary logical configuration according to some implementations.

FIG. 5 illustrates an exemplary implementation of a software and logical architecture of the SDR herein showing a number of software components and a logical arrangement of the SDR. An SDR stack 502 includes a wireless MAC layer module 504, a wireless physical layer (PHY) module 506, and an RCB manager module 508 that includes a DMA memory manager 510, and that may correspond to RCB manager 218, discussed above. These components provide for system support, including driver framework, memory management, streamline processing, and the like. The role of the PHY module 506 is to convert information bits into a radio waveform, or vice versa. The role of the MAC layer module 504 is to coordinate transmissions in wireless networks to avoid collisions. Also included is an SDR supporting library 512 that includes an SDR physical layer (PHY) library 514, streamline processing support 516 and real-time support 518 (e.g., for ensuring core dedication, as discussed additionally below). The SDR stack software components may exist at various times in system memory, cache, and/or mass storage or other computer readable storage media, as is known in the art.

The software components in implementations of the SDR herein provide necessary system services and programming support for implementing various wireless PHY and MAC protocols in a general-purpose operating system, such as Windows® XP, Windows Vista®, Windows® 7, Linux®, Mac OS® X, or other suitable operating system. In addition to facilitating the interaction with the RCB, the implementations of the SDR stack 502 provide a set of techniques to greatly improve the performance of PHY and MAC processing on a general-purpose processor. To meet the processing and real-time requirements, these techniques make full use of various features in multi-core processor architectures, including the extensive use of lookup tables (LUTs), substantial data-parallelism with processor SIMD extensions, the efficient partitioning of streamlined processing over multiple cores, and exclusive dedication of cores for software radio tasks.

Implementations of the SDR software may be written in any suitable programming language(s). For example, in some implementations, the software may be written in C, with, additionally, some assembly language for performance-critical processing. Further, some implementations of the SDR stack 502 may be implemented as a network device driver on a general-purpose operating system. Thus, RCB manager module 508 functions as a driver in the operating system for operating and managing the RCB and may include a PCIe driver for enabling use of the PCIe system bus. The SDR stack 502 exposes a virtual Ethernet interface 520 to the upper TCP/IP layer 522 of the kernel side, thereby enabling the SDR to appear and function as a network device. Since any software radio implemented on the SDR herein can appear as a normal network device, all existing network applications 524 used by a user are able to execute and interact with the SDR in an unmodified form. Further, on the other end, the SDR stack logically interacts with RCB firmware 522 via the system bus 524, which may be a PCIe system bus, as discussed above.

In some implementations of the SDR herein, SDR PHY processing library 514 extensively exploits the use of look-up tables (LUTs) and SIMD instructions to optimize the performance of PHY algorithms. For example, more than half of the PHY algorithms can be replaced with LUTs. Some LUTs are straightforward pre-calculations, others require more sophisticated implementations to keep the LUT size small. For instance, in the soft-demapper example discussed below, the LUT size (e.g., 1.5 KB for 802.11a/g 54 Mbps modulation) can be greatly reduced by exploiting the symmetry of the algorithm. Further, in the exemplary WiFi implementation described below, the overall size of the LUTs used in 802.11a/g is around 200 KB and in 802.11b is around 310 KB, both of which fit comfortably within the L2 caches of conventional multi-core processors.

Further, as discussed above, some implementations use SIMD (Single Instruction Multiple Data) instructions, such as the SSE2 (Streaming SMID Extensions 2) instruction set designed for Intel CPUs for speeding parallel processing of large numbers of data points, such as when processing digital samples. Since the SSE registers are 128 bits wide while most PHY algorithms require only 8-bit or 16-bit fixed-point operations, one SSE instruction can perform 8 or 16 simultaneous calculations. SSE2 also has rich instruction support for flexible data permutations, and most PHY algorithms, e.g., Fast Fourier Transform (FFT), Finite Impulse Response (FIR) Filter and Viterbi decoder algorithms, can fit naturally into this SIMD model. For example, the implementations of the Viterbi decoder according to the SDR herein uses only 40 cycles to compute the branch metric and select the shortest path for each input. As a result, Viterbi implementations can handle 802.11a/g at 54 Mbps modulation using only one 2.66 GHz CPU core in a multi-core processor, whereas conventional designs had to rely on specialized hardware implementations.

Additionally, it should be noted that other brands of processor architectures, such processors available from AMD, and PowerPC® processors available from Apple Inc. of Cupertino, Calif., USA, have very similar SIMD models and instruction sets that can be similarly utilized. For example, AMD's Enhanced 3DNow!® processor includes an SSE instruction set plus a set of DSP (Digital Signal Processor) extensions. The optimization techniques described herein can be directly applied to these and other GPP architectures as well. An example of a functional block using SIMD instruction optimizations is discussed further below.

FIG. 6A illustrates an algorithm optimization table 600 that summarizes some PHY processing algorithms implemented in the SDR herein, together with the LUT and SIMD optimization techniques applied for improving the processing speed. The algorithm table 600 includes an algorithm identification column 602, a configuration column 604, and I/O size column 606, an optimization method column 608, number of computations required for a conventional implementation column 610, computations required for the SDR implementation 612, and the amount of speed up 614 gained by the optimization. For example, for the IEEE 802.11b standard, algorithms that maybe optimize using LUTs according to the SDR herein include the scramble algorithm 620, the descramble algorithm 622, the mapping and spreading algorithm 624, and the CCK (Complementary Code Keying) modulator algorithm 626, while algorithms that maybe optimized using SIMD extensions include the FIR filter 628, and the decimation algorithm 630. Additionally, for the IEEE 802.11a standard, algorithms that maybe optimized using SIMD extensions include the FFT/IFFT (Fast Fourier Transform/Inverse Fast Fourier Transform) algorithm 632, algorithms that may be optimized using LUTs according to the SDR herein include the convolutional encoder algorithm 634, the Viterbi algorithm 636, the soft demapper algorithm 638, and the scramble and descramble algorithms 640. Further, the Viterbi algorithm 636 may also be further optimized using SIMD extensions.

Figure 6B:
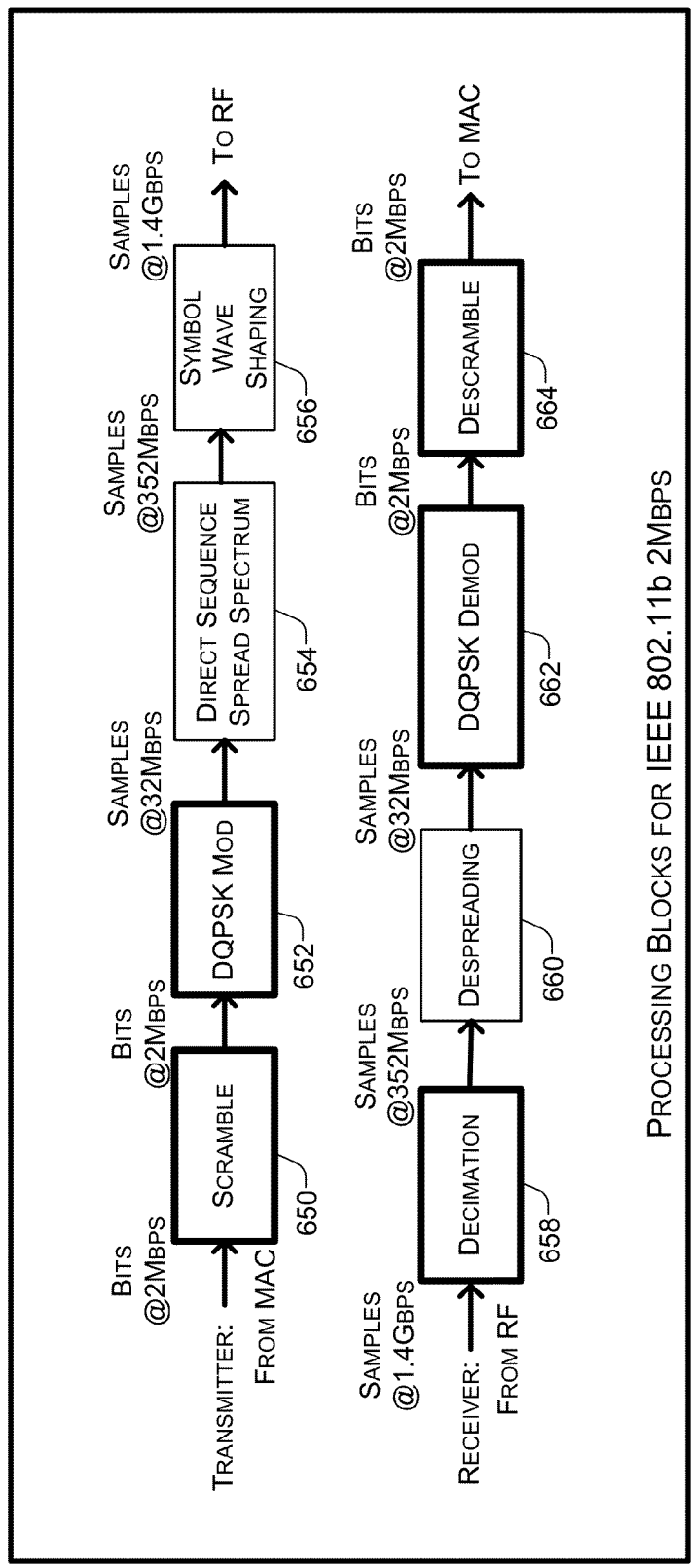
FIG. 6B illustrates optimized PHY blocks according to some implementations.

FIG. 6B illustrates an example of PHY operations for IEEE 802.11b at 2 Mbps, further showing examples of functional blocks that are optimized according to some implementations here, as discussed above with reference to FIG. 6A. The role of the PHY layer is to convert information bits into a radio waveform, or vice versa. As illustrated in FIG. 6B, at the transmitter side, the wireless PHY component first modulates the message (i.e., a packet or a MAC frame) into a time sequence of baseband signals. Baseband signals are then passed to the radio front end, where they are multiplied by a high frequency carrier and transmitted into the wireless channel. In the illustrated example, the data from the MAC goes to a scramble block 650, a DQPSK modulator block 652, a direct sequence spread spectrum block 654, a symbol wave shaping block 656, and then is passed to the RF front end. At the receiver side, the RF front end detects signals in the channel and extracts the baseband signal by removing the high-frequency carrier. The extracted baseband signal is then fed into the receiver's PHY layer to be demodulated into the original message. In the illustrated example, the signal from the RF front end is passed to a decimation block 658, a despreading block 660, a DQPSK demodulator block 662, a descramble block 664, and then to the MAC layer. Accordingly, advanced communication systems (e.g., IEEE 802.11a/b/g) contain multiple functional blocks in their PHY components. These functional blocks are pipelined with one another. Data is streamed through these blocks sequentially, but with different data types and sizes. For instance, as illustrated in FIG. 6B, different blocks may consume or produce different types of data at different rates arranged in small data blocks. For example, in 802.11b, as illustrated in FIG. 6B, the scrambler block 650 may consume and produce one bit, while DQPSK modulation block 652 maps each two-bit data block onto a complex symbol which uses two 16-bit numbers to represent the in-phase and quadrature (I/Q) components.

Each PHY block performs a fixed amount of computation on every transmitted or received bit. When the data rate is high, e.g., 11 Mbps for 802.11b and 54 Mbps for 802.11a/g, PHY processing blocks consume a significant amount of computational power. It is estimated that a direct implementation of 802.11b may require 10 Gops while 802.11a/g requires at least 40 Gops. These requirements are very demanding for software processing in GPPs.

PHY processing blocks directly operate on the digital waveforms after modulation on the transmitter side and before demodulation on the receiver side. Therefore, high-throughput interfaces are desired to connect these processing blocks as well as to connect the PHY with the radio front end. The required throughput linearly scales with the bandwidth of the baseband signal. For example, the channel bandwidth is 20 MHz in 802.11a. This requires a data rate of at least 20 Million complex samples per second to represent the waveform. These complex samples normally require 16-bit quantization for both I and Q components to provide sufficient fidelity, translating into 32 bits per sample, or 640 Mbps for the full 20 MHz channel. Over-sampling, a technique widely used for better performance, doubles the requirement to 1.28 Gbps to move data between the RF frond-end and PHY blocks for one 802.11a channel.

As discussed above with reference to FIG. 6A, in order to speed up processing of some blocks, implementations herein optimize certain functional blocks by using LUT and SIMD optimization techniques discussed above. In the illustrated example of FIG. 6B, as shown in bold, scramble block 650, descramble block 664, and DQPSK Modulator and DQPSK demodulator blocks 624 are optimized using LUTs stored in cache on the processor, corresponding to scramble algorithm 620, descramble algorithm 622, and mapping and spreading algorithm 624 discussed above with respect to FIG. 6A. Further, decimation block 658 is optimized using SIMD processor extensions corresponding to decimation algorithm 630 discussed above with respect to FIG. 6A.

Figure 6C:
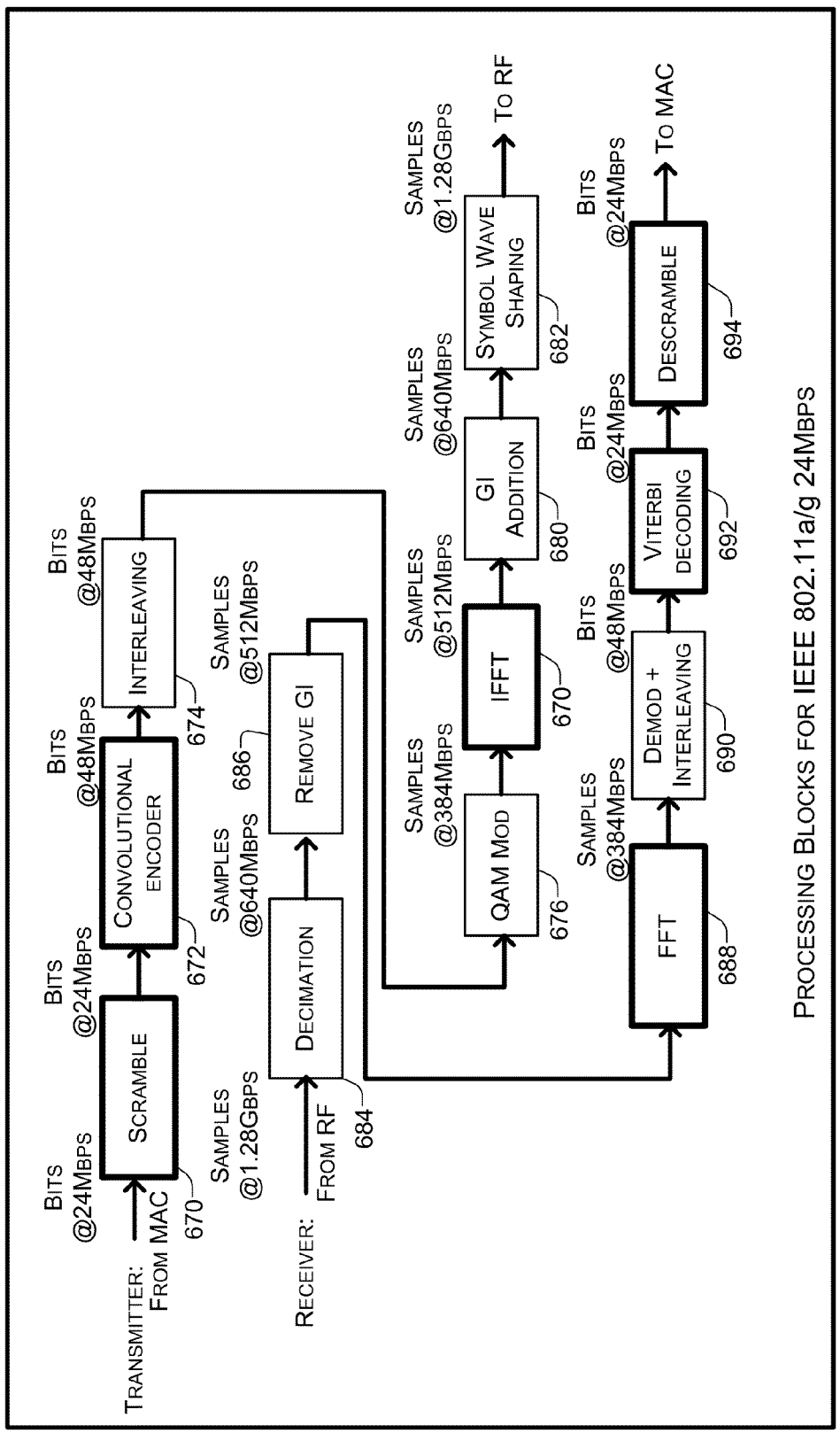
FIG. 6C illustrates optimized PHY blocks according to some implementations.

Similarly, FIG. 6C illustrates an example of PHY operations for IEEE 802.11b at 2 Mbps, showing in bold which functional blocks are optimized according to some implementations here, as discussed above with reference to FIG. 6A. On the transmitter side, the data received from the MAC layer is passed to a scramble block 670, convolutional encoder block 672, an interleaving block 674, a QAM modulator block 676, an IFFT block 670, a GI addition block 680, a symbol wave shaping block 682, and then is passed to the RF front end. On the receiver side, the signal from the RF front end is passed to a decimation block 684, a remove GI block 686, an FFT block 688, a demodulating and interleaving block 690, a Viterbi decoding block 692, a descramble block 694, and then to the MAC processing. In order to speed up processing of some blocks, implementations herein optimize certain blocks by using LUT and SIMD optimization techniques discussed above with respect to FIG. 6A. In the illustrated example of FIG. 6C, scramble block 670 and descramble block 694 are optimized using LUTs stored in cache on the processor corresponding to scramble and descramble algorithm 640 discussed above; FFT Block 688 and IFFT block 670 are optimized using SIMD processor extensions corresponding to FFT/IFFT algorithm 632 discussed above; convolutional encoder block 672 is optimized using LUTs corresponding to convolutional encoder algorithm 634 discussed above; and Viterbi decoding block 692 is optimized using both LUTs and SIMD processor extensions corresponding to Viterbi algorithm 636 discussed above. Furthermore, in addition to the optimizations illustrated in this example, other optimization opportunities may be apparent to those of skill in the art in light of the disclosure herein.

SIMD Example Based on FIR Filter

The following provides an example of how to use SSE instructions to optimize the implementation of a FIR (Finite Impulse Response) filter in implementations of the SDR herein, corresponding to FIR filter algorithm 628 discussed above with respect to FIG. 6A, with it being understood that the optimizations of the other algorithms, such as decimation 630, may be similarly implemented. FIR filters are widely used in various PHY layers. An n-tap FIR filter is defined as follows:

$$y[t] = \sum_{k=0}^{n-1} c_k * x[t-k],$$

where x[.] are the input samples, y[.] are the output samples, and $c_k$ are the filter coefficients. With SIMD instructions, it is possible to process multiple samples at the same time. For example, Intel SSE supports a 128-bit packed vector and each FIR sample takes 16 bits. Therefore, it is possible to perform m=8 calculations simultaneously. To facilitate SSE processing, the data layout in memory should be carefully designed.

Figure 7A:
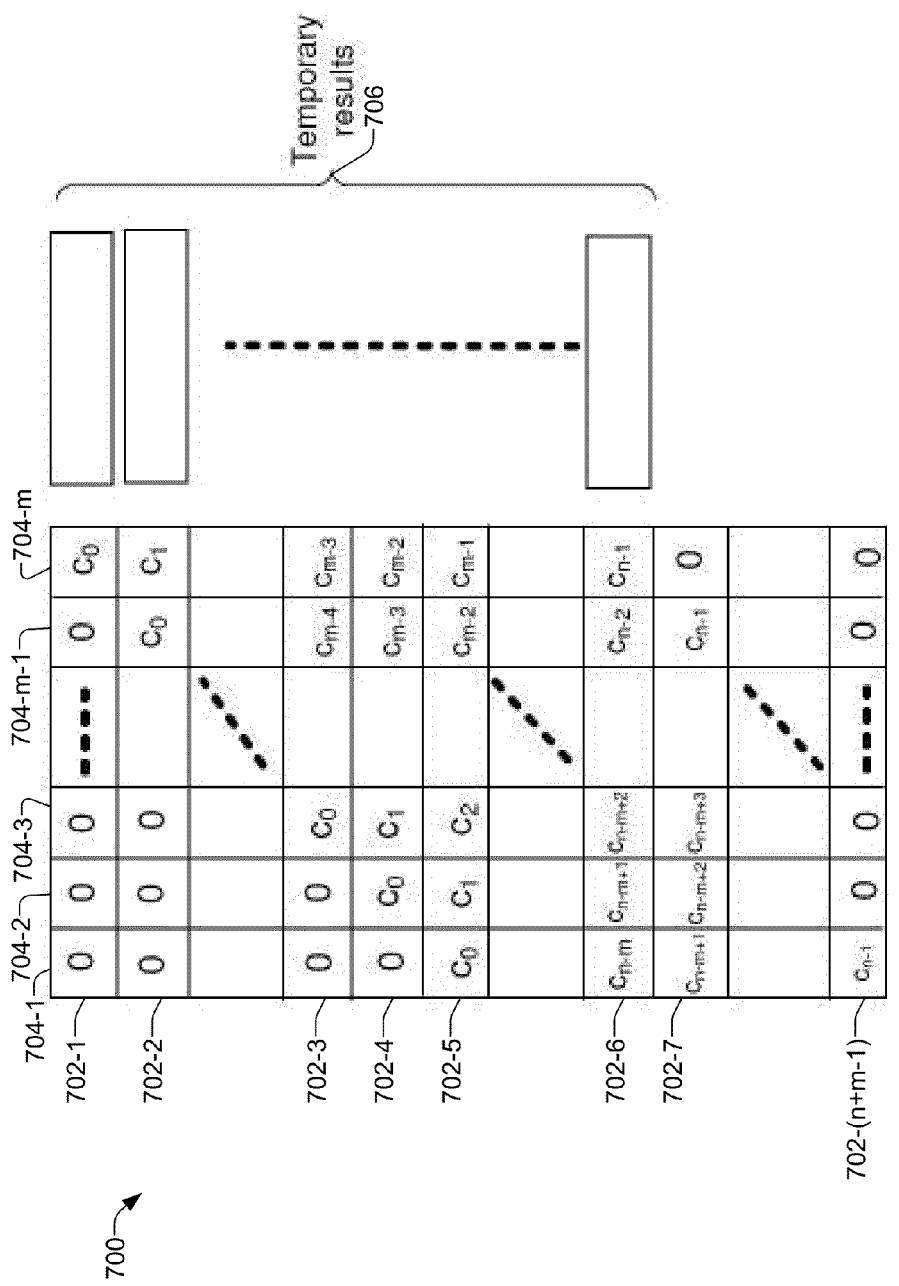
FIG. 7A illustrates an exemplary memory layout for SIMD (Single Instruction Multiple Data) processing according to some implementations.

FIG. 7A illustrates a memory layout 700 of the FIR coefficients according to implementations herein. Each row 702-1, . . . , 702-(n+m−1) forms a packed-vector containing m components for SIMD operations. The coefficient vector of the FIR filter is replicated in each column 704-1, . . . , 704-m in a zigzag layout. Thus, the total number of rows is (n+m−1). There are also n temporary variables 706 containing the accumulated sum up to each FIR tap for each sample.

Figure 7B:
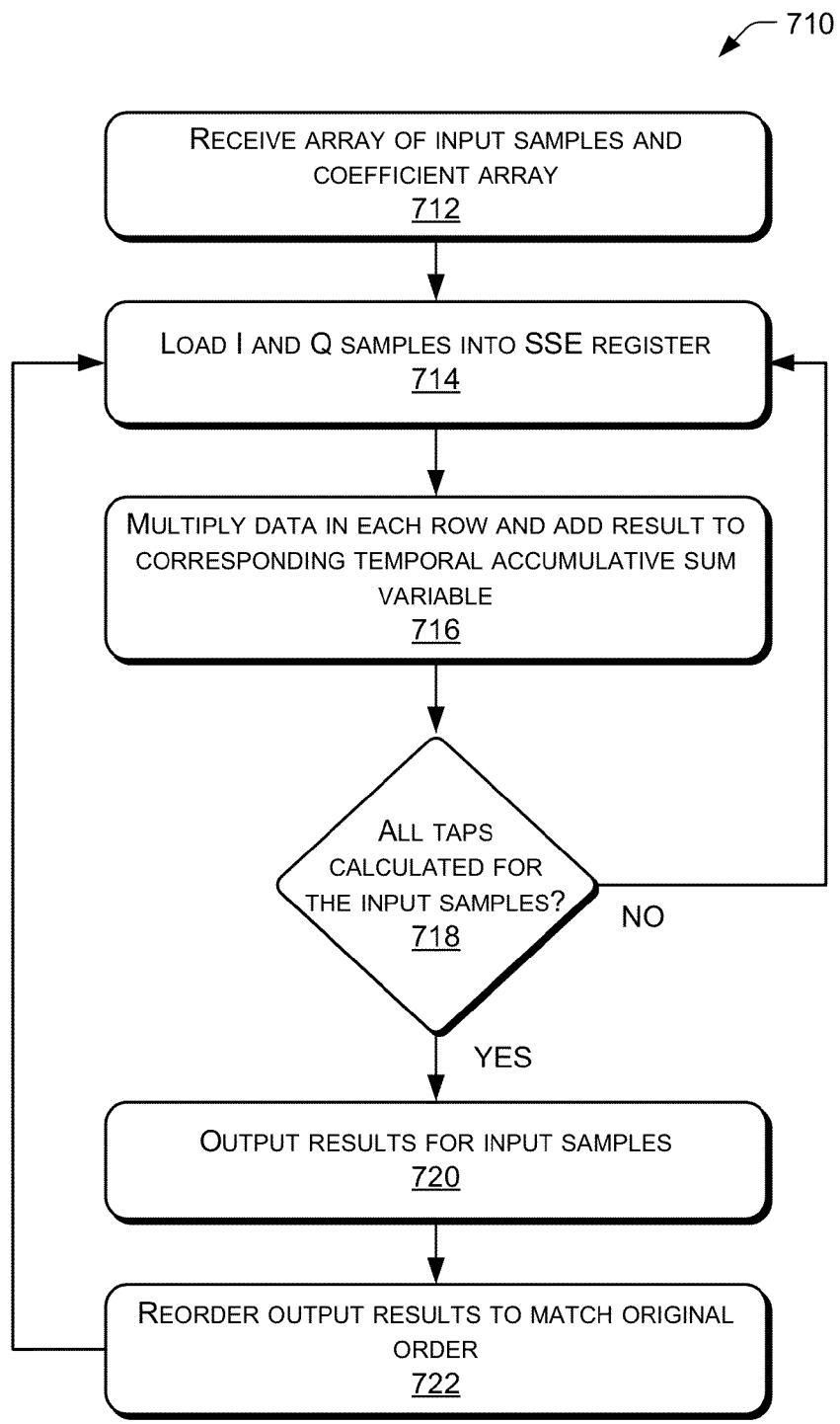
FIG. 7B illustrates a flowchart of an exemplary process for SIMD processing according to some implementations.

FIG. 7B illustrates a flowchart of an exemplary process for performing the SIMD operations of the FIR filter executed by the PHY layer of the SDR stack on a core of a multi-core processor. The process receives an array of input samples and a coefficient array, and outputs the filtered samples in an output sample buffer.

At block 712, the process receives an array of input samples and a coefficient array. The input samples contain two separate sample streams, with the even and odd indexed samples representing the I and Q samples, respectively. The coefficient array is arranged similarly to the layout of FIG. 7A, but with two sets of FIR coefficients for I and Q samples, respectively.

At block 714, for each iteration, four I and four Q samples are loaded into an SSE register.

At block 716, the process multiplies the data in each row and adds the result to the corresponding temporal accumulative sum variable.

At block 718, the process determines whether all the samples in the array of input samples have been processed to calculate all taps. If not, the process returns to block 714 to load more I and Q samples into the SSE registers.

At block 720, the results are output for the input samples when all taps have been calculated for the input samples. When the input sample stream is long, there are nm samples in the pipeline and m outputs are generated in each iteration. Note that the output samples may not be in the same order as the input samples. For example, some algorithms do not always require the output to have exactly the same order as the input.

Accordingly, at block 722, the output results can be reordered to the original order. This can be accomplished using a few shuffle instructions to place the output samples in original order, if needed. The process then returns to block 714 to continue to receive the stream of input samples from block 712 until all samples have been processed. Thus, while the foregoing provides a specific example of SIMD processing for speeding processing of digital samples in the SDR herein, it will be apparent to those of skill in the art in light of the disclosure herein that this process can be applied to optimize other SDR algorithms on one or more cores of a multi-core processor according to the implementations herein, such as the examples discussed above with respect to FIGS. 6A-6C.

High-Performance SDR Processing

Implementations of the SDR herein achieve high-performance SDR processing using software techniques that include efficient physical layer processing, multi-core streamline processing, and real-time support, each of which is described additionally below.

Efficient PHY Processing

In a memory-for-computation tradeoff, implementations of the SDR herein rely upon the large-capacity, high-speed cache memory in multi-core processors to accelerate PHY processing using pre-calculated LUTs stored in the PHY library. Contemporary processor architectures, such as Intel Core 2, usually have at least several megabytes of onboard cache with a low (e.g., 10~20 cycles) access latency. If LUTs are pre-calculated for a large portion of PHY algorithms and stored in the onboard cache for a corresponding core, this can greatly reduce the computational requirement for online processing and speed up overall processing time.

For example, the soft demapper algorithm 638 used in demodulation in the IEEE 802.11a standard needs to calculate the confidence level of each bit contained in an incoming symbol. This task involves rather complex computations proportional to the modulation density. More precisely, the soft demapper algorithm 638 conducts an extensive search for all modulation points in a constellation graph and calculates a ratio between the minimum of Euclidean distances to all points representing one and the minimum of distances to all points representing zero. In implementations of the SDR herein, the confidence levels for all possible incoming symbols are pre-calculated based on their I and Q values, and LUTs are built to directly map the input symbol to confidence level. Such LUTs need not be large. For example, in 802.11a/g with a 54 Mbps modulation rate (64-QAM), the size of the LUT for the soft demapper 638 is about 1.5 KB.

Figure 7C:
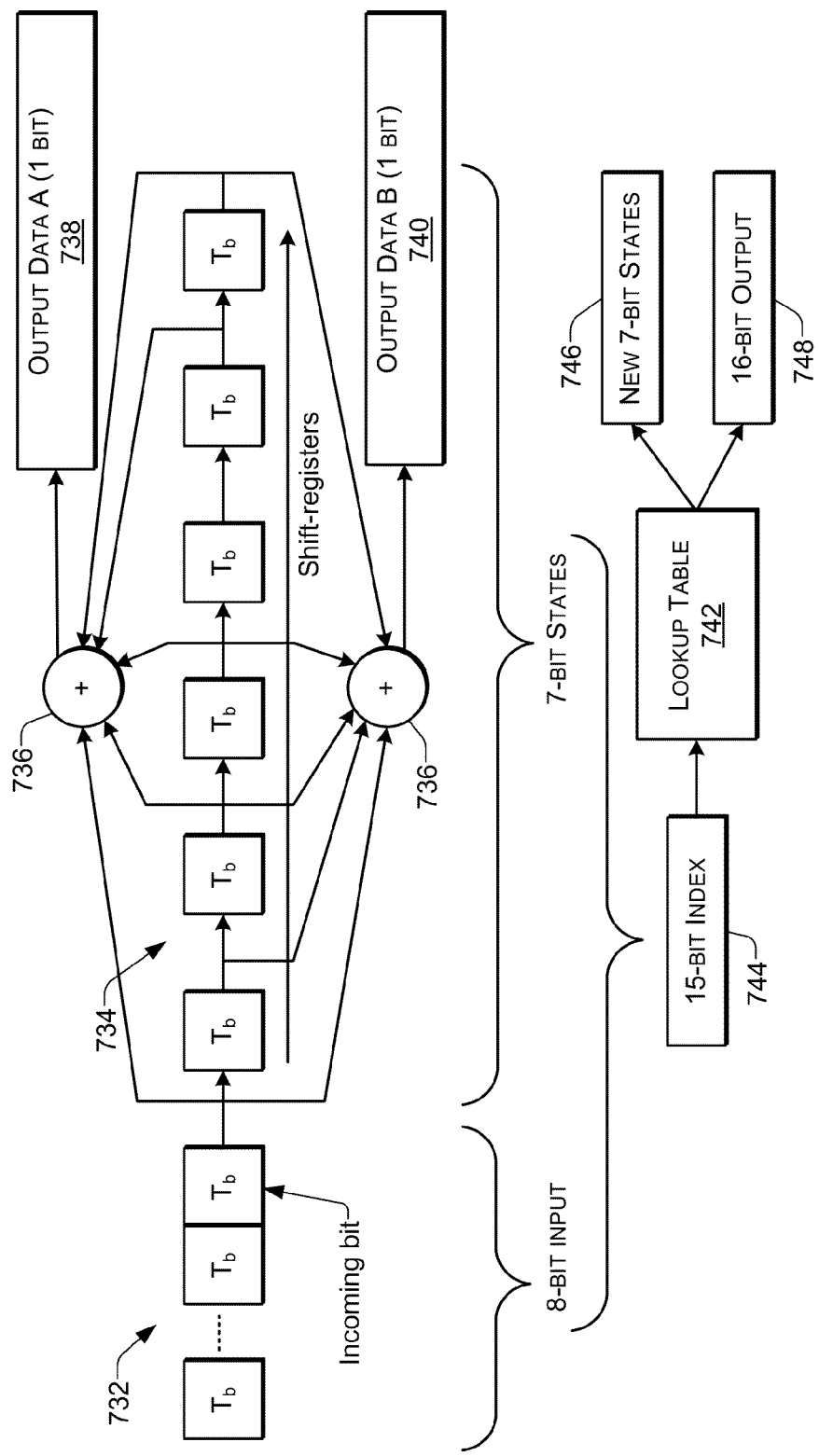
FIG. 7C illustrates an exemplary diagram showing processing using lookup tables according to some implementations.
Figure 7D:
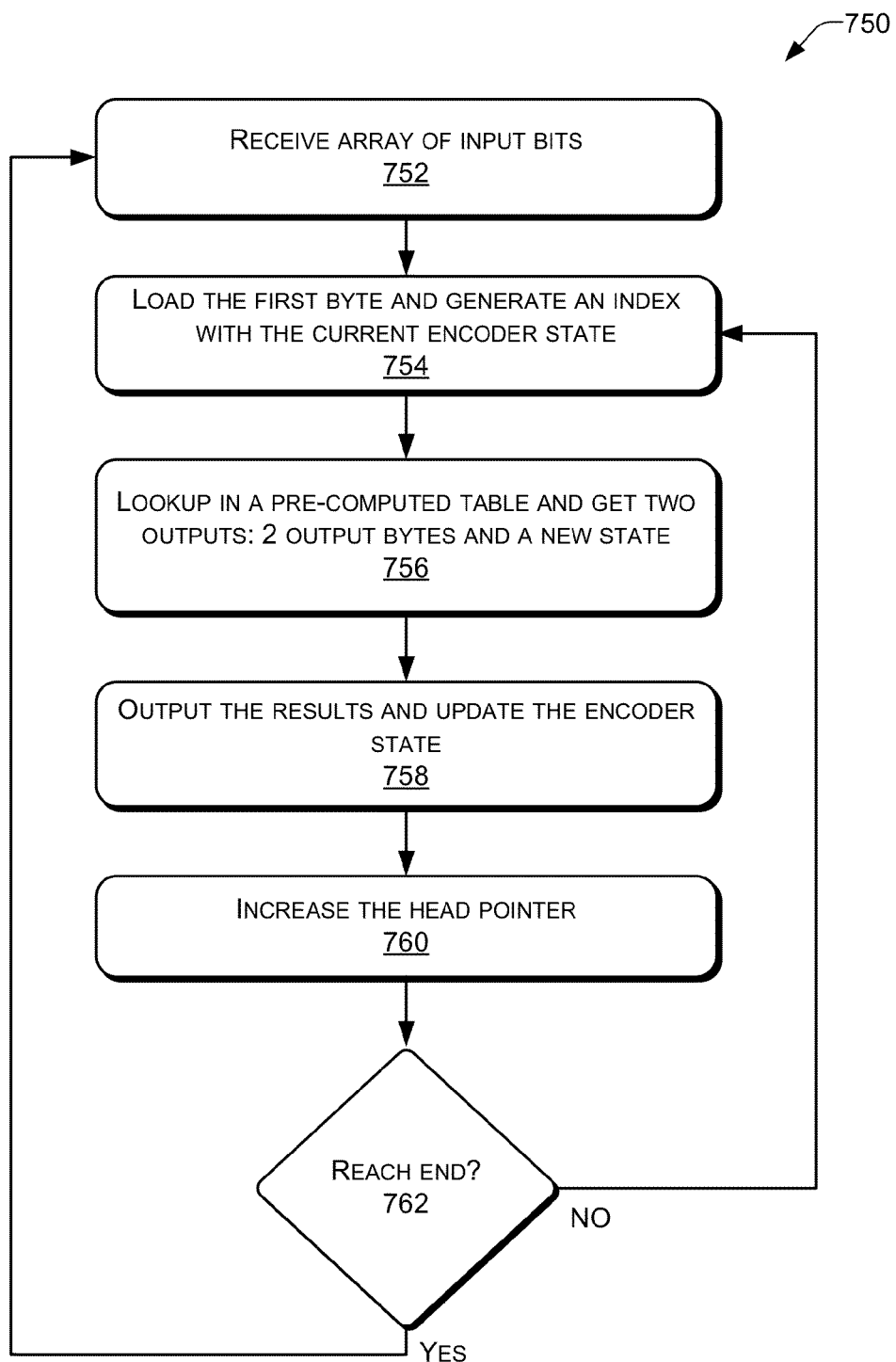
FIG. 7D illustrates a flowchart of an exemplary process using lookup tables according to some implementations.

FIGS. 7C-7D illustrate an example of SDR processing using an LUT according to some implementations herein. FIG. 7C illustrates how processing of a functional block can be speeded up by using a precomputed LUT instead of performing the actual processing of the bits using the processing algorithm. For example, when there are a finite combination of input bits and corresponding output data, then an LUT can be precomputed to be used to quickly match the input with corresponding output. In FIG. 7C, an array of input bits of a digital sample is received as a bit stream for processing, such as in one of the functional processing blocks described above with reference to FIGS. 6A-6C that is able to use an LUT to speed processing (e.g., the convolutional encoder algorithm). The convolutional encoder normally works in the following way. The convolutional encoder algorithm maintains seven shift registers 734, which form the state of the encoder. For each incoming bit, the algorithm 736 selects several bits in the shift registers 734 and performs eXclusive OR (XOR) operations on them, then two encoded output bits are generated as output data A 738 and output data B 740. Then, the shift registers 734 shift right and the input bit is put into the leftmost register. Conventionally, to process one bit, it takes eight operations to compute the outputs (i.e., to produce a 2-bit output from a 1-bit input). However, as discussed above, the processing can avoid the actual processing of the algorithm 736 by using LUT 742. Thus, instead of processing one bit at a time, an 8-bit data can be treated as a single input for processing using the LUT. The 8-bit input and the 7-bit states of the current state can be combined to generate a 15-bit index 744. The 15-bit index is then located in the LUT 742, and the corresponding precomputed new 7-bit states 746 and a 16-bit output 748 are determined from the LUT 742 instead of processing each bit individually by processing the algorithm 736. Thus, it may be seen that if all possible 15-bit indices and their corresponding output 7-bit states 746 and 16-bit outputs 748 are precomputed and stored in LUT 742, the actual processing time for the SDR sample stream can be greatly expedited (i.e., encoding of eight bits can be carried out using a single lookup operation).

FIG. 7D illustrates an exemplary process 750 that may be executed by the PHY layer of the SDR stack on a core of a multi-core processor by using an LUT instead of processing the bit stream using a conventional algorithm, such as the convolutional encoder algorithm. Other algorithms in the SDR pipeline may similarly be expedited by the use of precomputed LUTs, as discussed above with reference to FIGS. 6A-6C.

At block 752, an array of input sample bits is received for processing as a stream of bits.

At block 754, the process loads the first byte (8 bits) and generates an index with the current encoder state (the 7 bit state).

At block 756, the process accesses the precomputed LUT using the generated index and locates two values: two output bytes (i.e., a 16-bit output) and a 7-bit new state.

At block 758, the two output bytes are passed as output to the next processing block in the SDR processing stream, e.g., as illustrated in FIG. 6B or 6C, and the 7-bit new state is used for processing the next byte in the sample bit stream.

At block 760, the head pointer is increased to encompass the next eight bits.

At block 762, the process determines whether the end of the bit array has been reached. If not, the process returns to block 754 to process the next byte; if so, the process goes to block 752 to receive the next array of input bits.

As discussed above with reference to FIGS. 6A-6C, more than half of the common PHY algorithms of the IEEE 802.11 standards can be supplanted with LUTs, thereby resulting in a processing time speedup 614 from between approximately 1.5× to 50× (see, e.g., FIG. 6A). Since the size of each LUT is sufficiently small, the sum of all LUTs in a processing path can easily fit in the L2 caches of typical multi-core processor cores. Accordingly, when combined with core dedication, as discussed below, the possibility of cache collisions is very small. As a result, the LUTs of the implementations herein are almost always located in onboard caches during PHY processing. Additionally, while an exemplary implementation has been illustrated in FIGS. 7C-7D to describe how an LUT can be used to speed SDR processing, it should be understood that the other algorithms discussed above as being able to be expedited with LUTs can be similarly processed using pre-computed LUTs.

Further, in order to accelerate PHY processing with data-level parallelism, implementations of the SDR herein also use the SIMD processor extensions discussed above, such as SSE, SEE2, 3DNow!®, and AltiVec® provided in conventional multi-core processors. Although these extensions were originally designed for multimedia and graphics applications, the extensions also match the needs of wireless signal processing very well because many PHY algorithms have fixed computation structures that can easily map to large vector operations. Measurements show that such SIMD extensions substantially speed up PHY processing in implementations of the SDR herein.

Multi-Core Streamline Processing

Even with the above optimizations, a single CPU core may not have sufficient processing capacity to meet the processing requirements of high-speed wireless communication technologies. As a result, implementations of the SDR herein are able to use more than one core in a multi-core processor for PHY processing. In some implementations, the multi-core technique is also scalable to provide for compatibility with increasingly more complex signal processing algorithms as wireless technologies progress.

As discussed above, such as with respect to FIGS. 6B and 6C, physical layer processing typically contains a number of functional blocks or distinct stages in a pipeline. These blocks differ in processing speed and in input/output data rates and units. A block is only ready to execute when the block has received sufficient input data from the preceding block. Therefore, a key issue is how to schedule a functional block on multiple cores when the block is ready for processing.

Figure 8A:
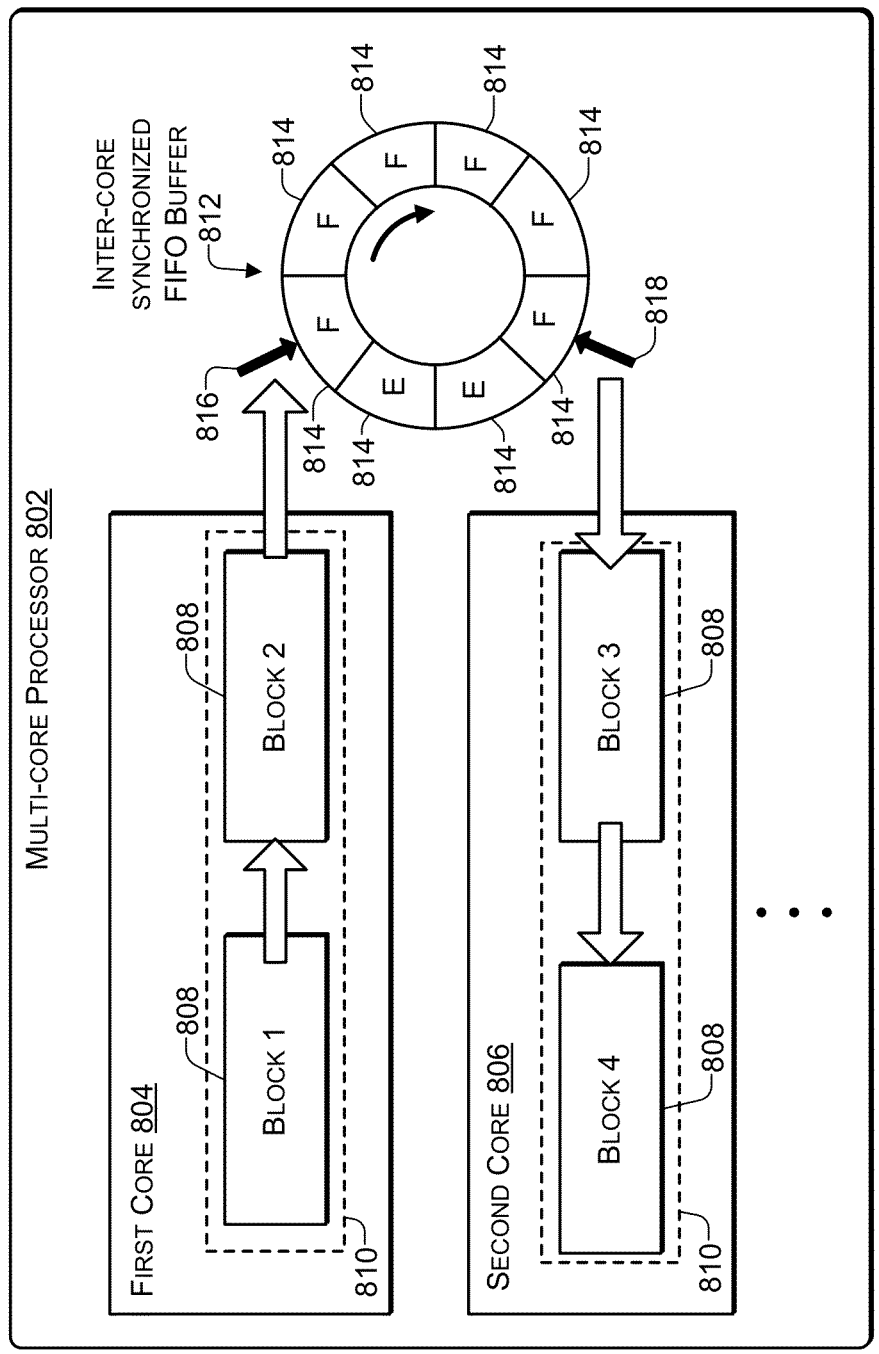
FIG. 8A illustrates an exemplary synchronized First-In-First-Out (FIFO) buffer according to some implementations.

FIG. 8A illustrates an exemplary implementation for processing data in functional blocks on different cores in a multi-core processor 802, which may correspond to multi-core processors 102, 202 discussed above. For example a first core 804 and a second core 806 may be used to process the functional blocks discussed above with reference to FIGS. 6A-6C. First core 804 may be located on the same multi-core processor as second core 806, or the cores 804, 806 may be located on separate processors.

In FIG. 8A, the first core 804 and the second core 806 process a plurality of functional blocks 808 using a static scheduling scheme. This implementation is based on the observation that the schedule of each block in a PHY processing pipeline is actually static, i.e., the processing pattern of previous blocks can determine whether a subsequent block is ready or not. Implementations of the SDR herein can thus partition the whole PHY processing pipeline into several sub-pipelines 810 and statically assign the sub-pipelines 810 to different cores 804, 806. Within one sub-pipeline 810, when a first block 808 has accumulated enough data for the next block to be ready, the first block explicitly schedules the next block. Adjacent sub-pipelines from different blocks are connected with a synchronized FIFO 812 that manages the delivery of data between the sub-pipelines 810. For example, the synchronized FIFO 812 may be established in one of caches 106, 108 discussed above with respect to FIG. 1. Thus, implementations herein allow different PHY processing blocks 808 to streamline across multiple cores 804, 806 while communicating with one another through one or more shared memory synchronized FIFO queues. For example, if two blocks 808 (e.g., Block 2 and Block 3 of FIG. 8A) are running on different cores 804, 806, their access to the shared FIFO 812 must be synchronized. The traditional implementation of a synchronized FIFO uses a counter to synchronize the writer (producer) and reader (consumer) in what is referred to as a counter-based FIFO (CBFIFO).

However, this counter is shared by two processor cores, and every write to the variable by one core will cause a cache miss on the other core. Since both the producer and consumer modify this variable, two cache misses are unavoidable for each datum. It is also quite common to have very fine data granularity in PHY (e.g., 4-16 bytes as summarized in FIG. 6 discussed above). Therefore, such cache misses will result in significant overhead when synchronization has to be performed very frequently (e.g., once per microsecond) for such small pieces of data. In implementations of the SDR herein, an inter-core synchronized circular FIFO buffer 812 is implemented that does not use a shared synchronization variable. Instead of having a shared variable, implementations herein augment each data slot 814 in the synchronized FIFO buffer 812 with a header that indicates whether the slot is empty or full (i.e., "E" or "F"). Furthermore, each data slot 814 is padded to be a size that is equal to a multiple of a cache line size. Thus, the consumer is always chasing the producer in the circular buffer 812 for filled slots, as outlined in the following pseudo code:

```
// Producer:
void write_fifo ( DATA_TYPE data ) {
    while (q[w_tail].flag>0); // spin wait
    q[w_tail].data = data;
    q[w_tail].flag = 1; // occupied
    w_tail = (w_tail+1) % q_size;
}
// Consumer:
void read_fifo ( DATA_TYPE * pdata ) {
    while (q[r_head].flag==0); // spin
    *data = q[r_head].data;
    q[r_head].flag = 0; // release
    r_head = (r_head + 1) % q_size;
}
```

This chasing-pointer FIFO (CPFIFO) largely mitigates the overhead even for very fine-grained synchronization through implementation of a producer pointer 816 and a consumer pointer 818. For example, if the speed of the producer (e.g., Block 2 on first core 804) and consumer (e.g., Block 3 on second core 806) is the same, and the two pointers are separated by a particular offset (e.g., two cache lines in the Intel architecture), no cache miss will occur during synchronized streaming since the local cache will pre-fetch the following slots before the actual access. If the producer and the consumer have different processing speeds, e.g., the consumer (reader) is faster than the producer (writer), then eventually the consumer will wait for the producer to release a slot. In this case, each time the producer writes to a slot, the write will cause a cache miss at the consumer. However, the producer will not suffer a miss since the next free slot will be prefetched into its local cache. Further, the cache misses experienced by the consumer will not cause significant impact on the overall performance of the streamline processing since the consumer is not the bottleneck element. Additionally, while the FIFO buffer 812 is illustrated as being circular, it is understood in the art that this is only for illustration purposes and that the buffer is actually a logical location in the cache memory and that the locations of the empty and full data slots in the buffer 812 are actually maintained by the relative locations of the pointers 816, 818.

Figure 8B:
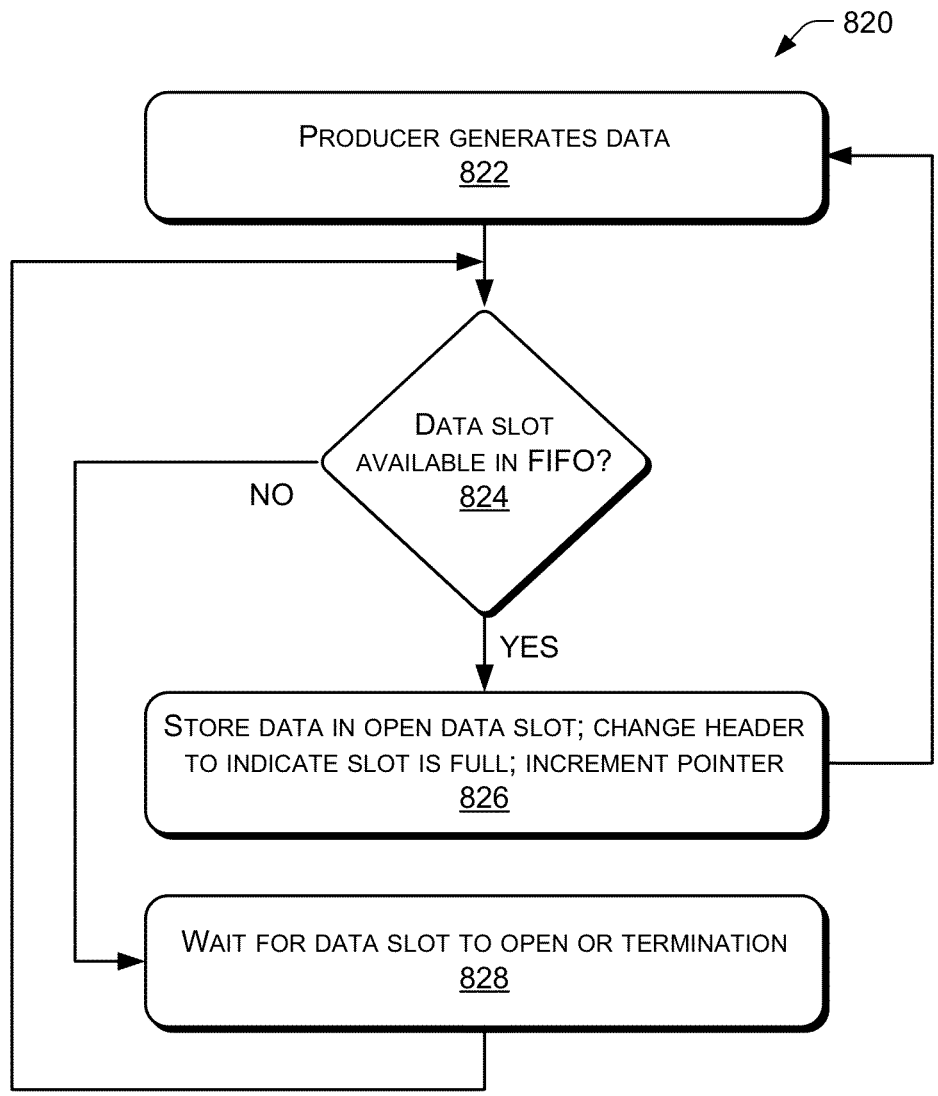
FIG. 8B illustrates a flowchart of an exemplary process of a producer according to some implementations.

FIG. 8B illustrates a flowchart of an exemplary process 820 carried out by the producer (e.g., first core 804) for processing digital samples using the synchronized FIFO buffer 812. The process is executed by the PHY module of the SDR stack using multiple cores of a multi-core processor 802.

At block 822, the producer generates data. For example, first core 804 processes data in functional blocks 808 (e.g., Block 1 and Block 2) to generate the data.

At block 822, the producer determines whether an available data slot is open in the FIFO buffer 812 by referring to the data slot to which the producer pointer 816 is currently pointing and checking the header for that data slot.

At block 826, if the header indicates that the current slot is empty the producer stores the generated data in the empty data slot, and increments the producer pointer 816 by one data slot.

At block 828, if the header indicates that the data slot to which the producer pointer is currently pointing is full, the producer waits for an empty data slot to become available. A termination condition can also be set by a user when it is desired to stop the process.

Figure 8C:
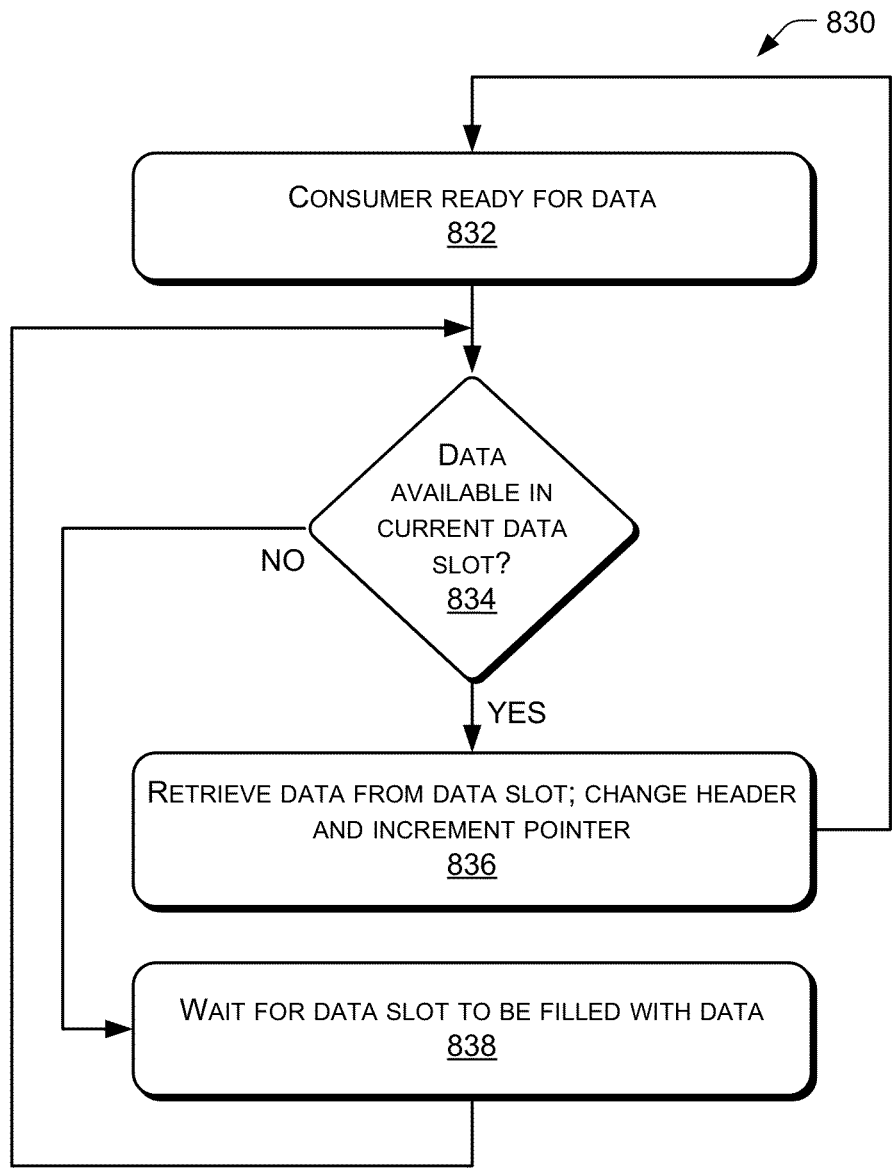
FIG. 8C illustrates a flowchart of an exemplary process of a consumer according to some implementations.

FIG. 8C illustrates a flowchart of an exemplary process 830 carried out by the consumer (e.g., second core 806) for processing digital samples using the synchronized FIFO buffer 812. The process is executed by the PHY module of the SDR stack using multiple cores of a multi-core processor 802.

At block 832, the consumer is ready to receive and process data. For example, in the pipeline of Block 3 and Block 4 in second core 806, data may have been passed from Block 3 to Block 4, and Block 3 is now ready for more data.

At block 834, the consumer checks the data slot to which the consumer pointer 818 is currently pointing to determine if the slot contains available data by checking the header to determine whether the header indicates that the slot is full or empty.

At block 836, when the slot contains data, the consumer takes the data from the data slot, thereby opening the data slot and changing the header of the data slot to indicate that the data slot is now empty. The consumer also increments the consumer pointer to the next data slot.

At block 838, if no data is available in the current data slot, the consumer continues to check the data slot and waits until the data slot is filled with data.

Real-Time Support

SDR processing is a time-critical task that requires strict guarantees of computational resources and hard real-time deadlines. For example, in the 802.11 protocols, the wireless channel is a resource shared by all transceivers operating on the same spectrum. Thus, because simultaneously transmitting neighbors may interfere with each other, various MAC protocols have been developed to coordinate transmissions in wireless networks to avoid collisions.

Further, most modern MAC protocols, such as 802.11, require timely responses to critical events. For example, 802.11 uses a CSMA (Carrier-Sense Multiple Access) MAC protocol to coordinate transmissions. Transmitters are required to sense the channel before starting their transmission, and channel access is only allowed when no energy is sensed, i.e., the channel is free. The latency between sense and access should be as small as possible. Otherwise, the sensing result could be outdated and inaccurate, resulting in a collision. Another example is the link-layer retransmission mechanisms in wireless protocols, which may require an immediate acknowledgement (ACK) to be returned in a limited time window. Commercial standards like IEEE 802.11 mandate a response latency within tens of microseconds, which is challenging to achieve in software on a general-purpose processor running a general purpose OS.

Thus, as an alternative to relying upon the full generality of real-time operating systems, implementations herein obtain real-time guarantees by dedicating one or more processor cores to SDR processing in a multi-core processing system. Thus, because one or more cores are dedicated to the SDR, implementations herein guarantee sufficient computational resources, without being affected by other concurrent tasks in the system.

For example, wireless communications often require the PHY to constantly monitor the channel for incoming signals. Therefore, the PHY processing may need to be active all the times. It is desirable to schedule this monitoring task to operate continually on the same core to minimize overhead, such as cache misses or TLB flushes. Furthermore, isolating applications into different cores can result in better performance as compared to symmetric scheduling, since an effective use of cache resources and a reduction in locks can outweigh dedicating cores. Moreover, a core dedication mechanism is much easier to implement than a real-time scheduler, sometimes even without modifying an OS kernel. One example of a method for achieving core dedication according to implementations of the SDR herein is raising the priority of a kernel thread so that the kernel thread is pinned on a particular core and runs exclusively on that core until termination.

Implementations of the SDR herein use exclusive threads (i.e., "ethreads") to dedicate cores for real-time SDR tasks. The ethreads can be implemented without any modification to the kernel code. For example, an ethread can be implemented as a kernel-mode thread, and thereby exploit the processor affiliation that is commonly supported in conventional operating systems to provide control regarding on which core the kernel mode thread runs. Once the OS has scheduled the ethread on a specified physical core, the OS raises the priority and/or the IRQL (interrupt request level) on the thread to a level as high as the kernel scheduler, e.g., dispatch level in Windows®. Thus, the ethread takes control of the core and prevents itself from being preempted by other threads by raising the interrupt request level.

Running at such an IRQL, however, does not prevent the core from responding to hardware interrupts. Therefore, the interrupt affiliations of all devices attached to the host are also constrained. For example, if an ethread is running on a particular core, all interrupt handlers for installed devices are removed from the core, thus preventing the core from being interrupted by hardware. Furthermore, to ensure the correct operation of the computing device and operating system, implementations of the SDR herein always ensure core zero is able to respond to all hardware interrupts. Consequently, implementations of the SDR herein only allow ethreads to run on cores whose ID is greater than zero.

Exemplary Implementations

Exemplary implementations of the SDR herein include a fully functional WiFi transceiver on the SDR platform as an exemplary WiFi implementation. The exemplary WiFi implementation SDR stack supports all IEEE 802.11a/b/g modulations and can communicate seamlessly with commercial WiFi network cards. For instance, implementations of high-speed wireless protocols on general-purpose computing device architectures must overcome a number of challenges that stem from existing hardware interfaces and software architectures. First, transferring high-fidelity digital waveform samples into system memory for processing requires very high bus throughput. Conventional software radio platforms use USB 2.0 or Gigabit Ethernet, which cannot satisfy this requirement for sustaining high-speed wireless protocols. Second, physical layer (PHY) signal processing has very high computational requirements for generating information bits from waveforms, and vice versa, particularly at high modulation rates. Lastly, wireless PHY and media access control (MAC) protocols have low-latency real-time deadlines that must be met for correct operation. For example, the 802.11 MAC protocol requires precise timing control and ACK response latency on the order of tens of microseconds. Existing software architectures on the general-purpose computing devices cannot consistently meet this timing requirement.

Figure 9A:
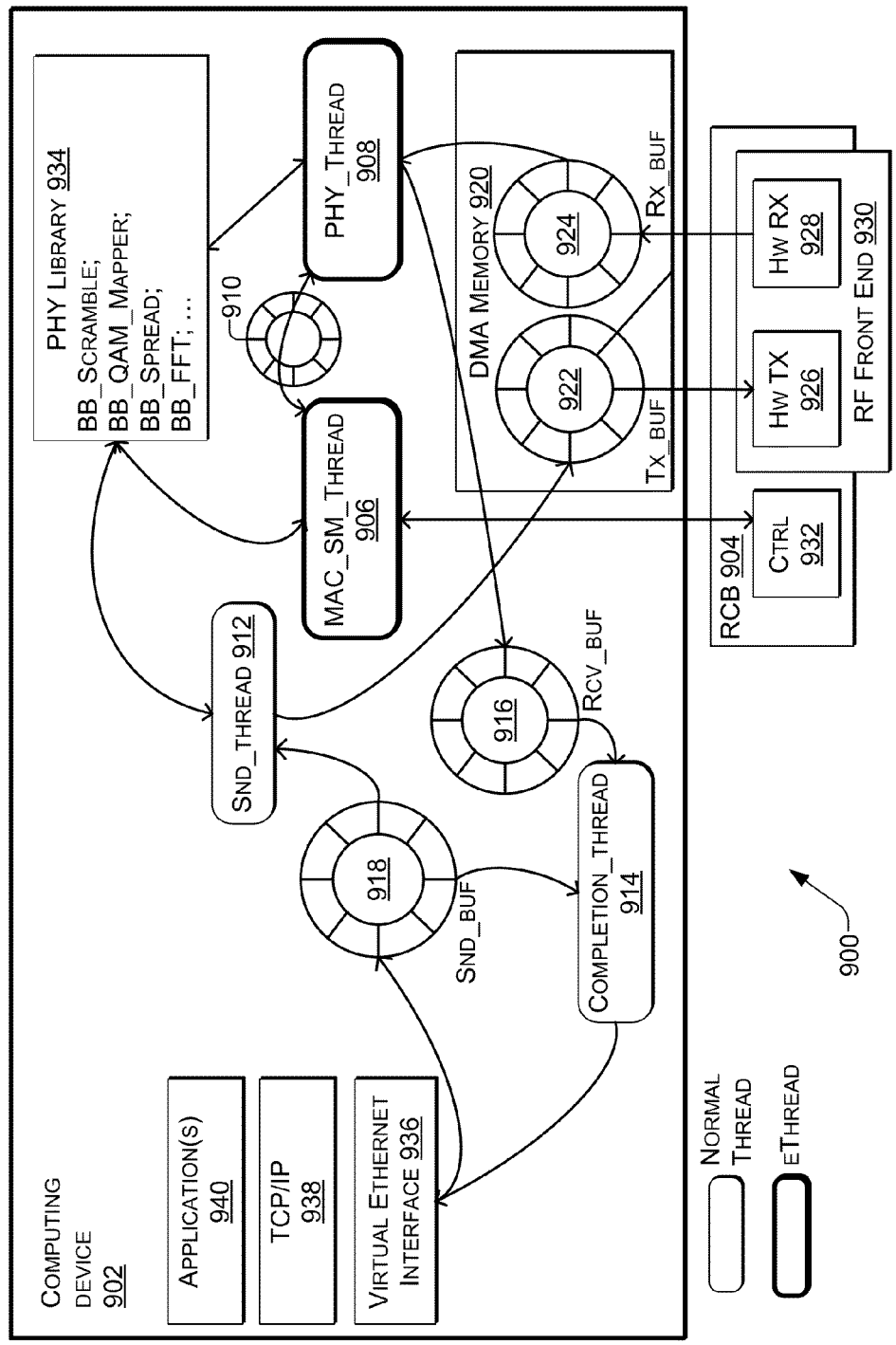
FIG. 9A illustrates an example of an SDR according to some implementations.

FIG. 9A illustrates an exemplary WiFi implementation 900 of the SDR herein implemented on hardware, such as a computing device 902, having a multi-core processor as described above with reference to FIGS. 1 and 2, and coupled to an RCB 904 corresponding to RCBs 116, 214, and/or 302. In the illustrated implementation, the MAC state machine (SM) is implemented as an ethread 906 by raising the priority of a kernel thread so that the kernel thread is pinned on a particular core and runs exclusively on that core until termination. Since a radio according to the 802.11 standard is a half-duplex radio, the demodulation components of the PHY can run directly within a MAC SM thread. Furthermore, if a single core is insufficient for all PHY processing (e.g., as may be the case with 802.11a/g), the PHY processing can be partitioned across two ethreads comprising MAC_SM thread 906 and a PHY_Thread 908. These two ethreads 906, 908 are streamlined using a synchronized CPFIFO 910, as discussed above with respect to FIGS. 8A-8C. An additional thread, Snd_thread 912, modulates the outgoing frames into waveform samples in the background. As discussed above, these modulated waveforms can be pre-stored in the RCB's memory to facilitate speedy transmission. Further, a Completion_thread 914 monitors a receive buffer, Rcv_buf 916 and notifies upper software layers of any correctly received frames. The completion thread 914 also cleans up Rcv_buf 916 and a send buffer, Snd_buf 918 after they are used. Because the functions of the Completion_thread 914 and the Snd_thread 912 do not require the same high performance and low latency of the PHY ethreads 906, 908, these other threads are not implemented as ethreads, and can be run on any available core.

In the illustrated example, DMA memory 920 includes a transmitter buffer TX_buf 922 and a receiver buffer RX_buf 924 for storing digital samples for transmission and reception on transmitter hardware 926 and receiver hardware 928, respectively, on the RF front end 930 as discussed above, such as with respect to FIG. 4. Furthermore, RCB 904 includes control modules 932, such as the DMA controller, bus controller, memory controller, and RF controller described above with respect to FIG. 4, and collectively represented as Ctrl 924, which exchange commands with MAC_SM_Thread 906 for ensuring proper interaction between RCB 904 and computing device 902. During streamline processing, MAC_SM thread 906 and PHY thread 908 access the PHY library 934 for accessing LUTs and SIMD instructions for carrying out optimized PHY processing, as discussed above with respect to FIGS. 6A-6C and 7A-7B. The processed digital samples are delivered to the receive buffer 916, are then presented via the completion thread 914 to virtual Ethernet interface 936, thereby to the TCP/IP layer 938, and thus, to one or more applications 940 also running on one or more cores of computing device 902.

Figure 9B:
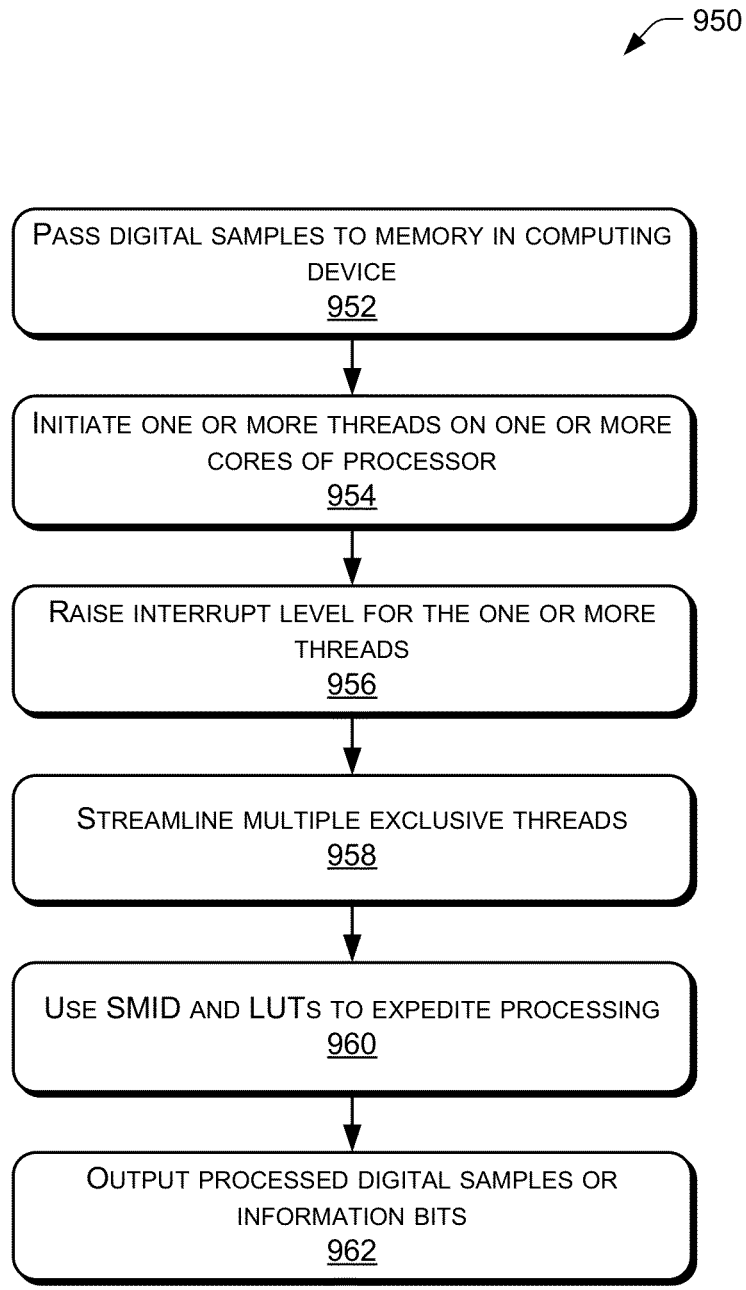
FIG. 9B illustrates an exemplary process for exclusively performing SDR processing on the one or more cores.

FIG. 9B illustrates an exemplary process 950 that may be executed using one or more cores of a multi-core processor for exclusively performing SDR processing on the one or more cores.

At block 952, digital samples are passed from the RCB to the memory in the computing device. The digital samples are received from the RF front end by the RCB and then may be passed to the memory in the computing device using direct memory access (DMA), or the like. The passing of the digital samples to the memory in the computing device may be controlled by a DMA controller on the RCB, and the DMA may also temporarily store the digital samples on the RCB in a buffer or onboard memory.

At block 954, threads may be initiated on one or more cores of the multi-core processor for performing SDR processing, such as PHY and MAC processing.

At block 956, the interrupt request level for the one or more cores may be raised to ensure that the threads are not interrupted so that the cores are able to exclusively perform SDR processing of the digital samples. Further, the interrupt handler for the one or more cores may also be removed to prevent hardware interrupts as well.

At block 958, when multiple threads operate on different cores, the processing between cores may be streamlined as discussed above using a synchronized FIFO between the cores.

At block 960, SMID and LUTs may be used where applicable to expedite the SDR processing of the digital samples.

At block 962, the processed digital samples are output for use, such as by an application on the computing device. Further, while the foregoing process illustrates exclusive core processing of digital samples received from the RF front end, it may be seen that digital samples generated by the computing device for transmission by the RF front end are similarly processed. For example, in the case of digital samples to be transmitted, steps 954-960 are the same, with the input being a bit stream generated or received by the computing device, such as from an application, and the output being processed digital samples ready for conversion to analog and transmission by the RF front end.

Figure 10:
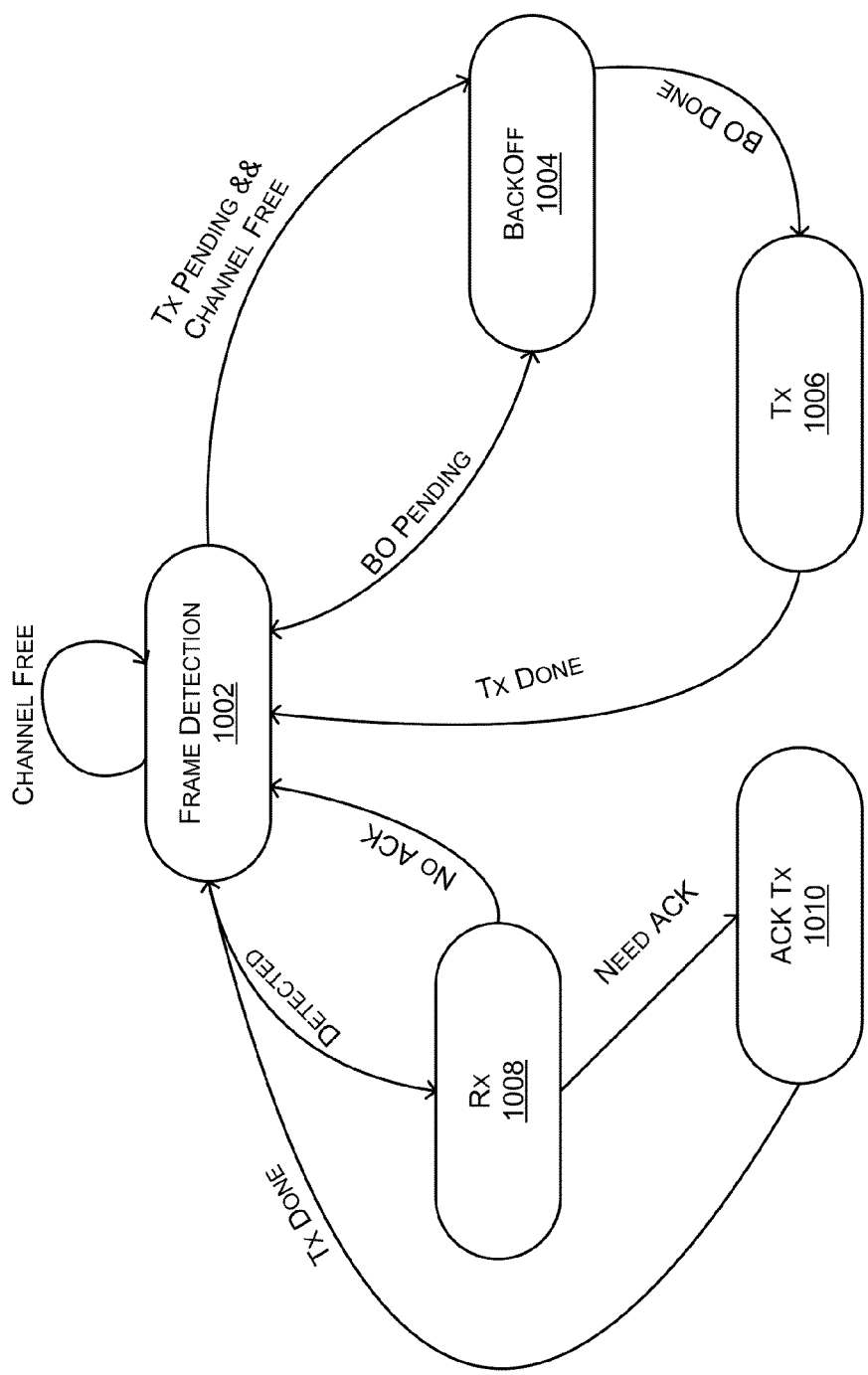
FIG. 10 illustrates exemplary MAC processing according to some implementations.

Further, the exemplary WiFi implementation 900 is able to implement the basic access mode of the 802.11 standard. Exemplary details of the MAC State Machine are illustrated in FIG. 10. Normally, the SM is in the Frame Detection (FD) state 1002. In the frame detection state 1002, the RCB 904 constantly writes samples into the Rx_buf 924. The SM (i.e. MAC_SM_Thread 906) continuously measures the average energy to determine whether the channel is clean or whether there is an incoming frame.

The transmission of a frame follows the carrier-sense multiple access (CSMA) mechanism. When there is a pending frame to be transmitted, the SM first checks whether the energy on the channel is low (i.e., no frame is currently being received). If the channel is busy, the transmission is deferred and a backoff timer 1004 is started. Each time the channel becomes free, the SM checks if any backoff time remains. If the timer goes to zero, the SM transmits the pending frame at block Tx 1006.

Further, when the exemplary WiFi implementation starts to receive a frame, it detects a high energy in the frame detection state 1002. In 802.11, SM uses three steps in the PHY layer to receive a frame at block Rx 1008. First, the PHY layer needs to synchronize to the frame, i.e., find the starting point of the frame (timing synchronization) and the frequency offset and phase of the sample stream (carrier synchronization). Synchronization is usually done by correlating the incoming samples with a pre-defined preamble. Subsequently, the PHY layer needs to demodulate the PLCP (Physical Layer Convergence Protocol) header, which is always transmitted using a fixed low-rate modulation mode. The PLCP header contains the length of the frame as well as the modulation mode, possibly a higher rate, of the frame data that follows. Thus, only after successful reception of the PLCP header will the PHY layer know how to demodulate the remainder of the frame.

After successfully receiving a frame at Rx 1008, the 802.11 MAC standard requires a receiving station to transmit an ACK frame in a timely manner as indicated at block ACK Tx 1010. For example, 802.11b requires that an ACK frame be sent with no more than a 10 μs delay to acknowledge receipt of the received frame. However, this short ACK requirement is quite difficult for an SDR implementation to achieve in software on a general-purpose computing device. Both generating and transferring the waveform across the system bus can cause a latency of several microseconds, and total time required is usually larger than the maximum amount mandated by the standard. Fortunately, an ACK frame generally has a fixed pattern. For example, in 802.11 all data in an ACK frame is fixed except for the sender address of the corresponding data frame. Thus, in the exemplary WiFi implementation 900, it is possible to pre-calculate most of an ACK frame (19 bytes), and update only the address (10 bytes). Further, this can be done early in the processing, immediately after demodulating the MAC header, and without waiting for the end of a frame. The waveform is then pre-stored into the memory of the RCB. Thus, the time for ACK generation and transferring can overlap with the demodulation of the data frame being received. After the MAC SM demodulates the entire frame and validates the CRC32 checksum, the MAC SM instructs the RCB to transmit the ACK, which has already been stored on the RCB. Thus, the latency for ACK transmission is very small because the ACK is already stored in the RCB and can be immediately transmitted without having to be generated or sent along the system bus.

In rare cases when the incoming data frame is quite small (e.g., the frame contains only a MAC header and zero payload), then the exemplary WiFi implementation cannot fully overlap ACK generation and the DMA transfer with demodulation to completely hide the latency. In this case, the exemplary WiFi implementation may fail to send the ACK in time. This problem is addressed by maintaining a cache of previous ACKs in the RCB. With 802.11, all data frames from one node will have exactly the same ACK frame. Thus, pre-allocated memory slots in the RCB can be used to store ACK waveforms for different senders (in some implementations, 64 different slots are allocated). Therefore, when demodulating a frame, if the ACK frame is already in the RCB cache, the MAC SM simply instructs the RCB to transmit the pre-cached ACK. With this scheme, the exemplary WiFi implementation may be late on the first small frame from a sender, effectively dropping the packet from the sender's perspective. But the retransmission, and all subsequent transmissions, will find the appropriate ACK waveform already stored in the RCB cache.

The exemplary WiFi implementation 900 has been implemented and tested as a full 802.11a/g/b transceiver, which support DSSS (Direct Sequence Spreading: 1 and 2 Mbps in 11b), CCK (Complementary Code Keying: 5.5 and 11 Mbps in 11b), and OFDM (Orthogonal Frequency Division Multiplexing: 6, 9 and up to 54 Mbps in 802.11a/g).

Accordingly, implementations of the SDR herein have been found to interoperate seamlessly with commercial hardware-based 802.11 devices, while supporting the full suite of 802.11a/b/g modulation rates and achieving substantially equivalent performance to the hardware-based devices at each modulation. As a result, it may be seen that implementations of the SDR herein can process signals sufficiently fast to achieve full channel utilization, and that the SDR can satisfy all timing requirements of the 802.11 standards with a software implementation on a general-purpose computing device.

Software Spectrum Analyzer

Figure 11:
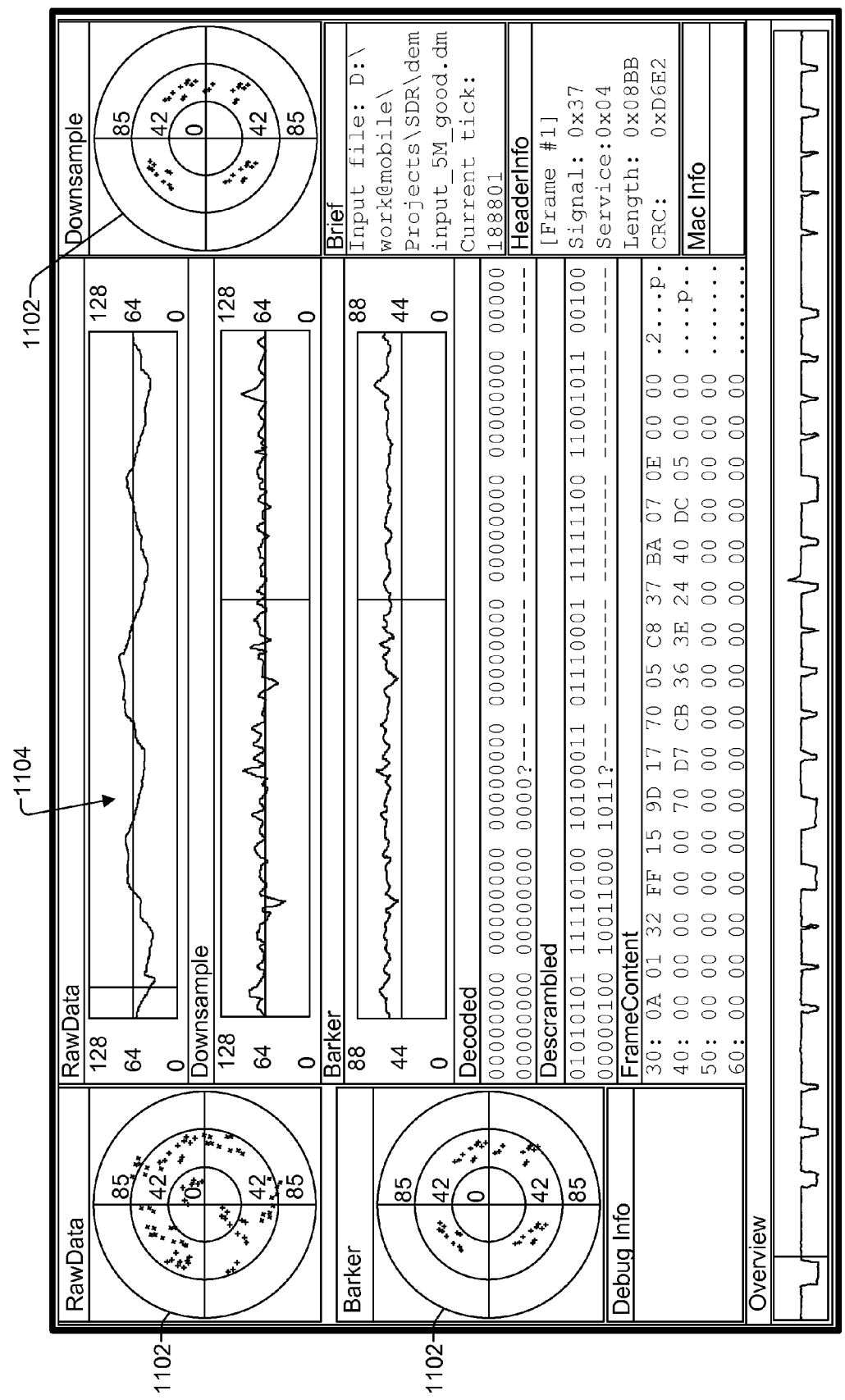
FIG. 11 illustrates an exemplary software spectrum analyzer according to some implementations.

FIG. 11 illustrates a software implemented spectrum analyzer 1100 according to some implementations herein that can be implemented on a general-purpose computing device as an application for use in analyzing the performance of the SDR herein. For example, it is easy for implementations of the SDR herein to expose all PHY layer information to applications running on the computing device. The software spectrum analyzer 1100 is such an application that can take advantage of this information. For example, the spectrum analyzer 1100 can run on one or more cores of the processor of the general-purpose computing device while the SDR is in operation, and can graphically display the waveform and modulation points of the radio communications in one or more constellation graphs, as well as the demodulated results. In the implementation illustrated in FIG. 11, raw data, down sampled data, and barker data are displayed in both constellation graphs 1102 and waveform graphs 1104. Also displayed are decoded information, descrambled information, debug info, frame content, MAC info, overview info, header info and a brief description of file information. Further, while commercially available spectrum analyzers may have similar functionality and a wider sensing spectrum band, they are also more expensive.

Extensions to Radio Protocols

The flexibility of implementations of the SDR herein allows the development and testing of extensions to current radio protocols, such as 802.11.

Jumbo Frames

When channel conditions are good, transmitting data using larger frames can reduce the overhead of MAC/PHY headers, preambles and the per frame ACK. However, the maximal frame size of 802.11 is fixed at 2304 bytes. With simple modifications (changes in a few lines to the PHY algorithms), the exemplary WiFi implementation can transmit and receive jumbo frames of up to 32 KB. For example, when two implementations of the SDR herein using the exemplary WiFi implementation described above and with jumbo frame optimization, the throughput of data can be increased. For instance, when the frame size is increased from 1 KB to 6 KB, the end-to-end throughput increases 39% from 5.9 Mbps to 8.2 Mbps. When the frame size is further increased to 7 KB, however, the throughput drops because the frame error rate also increases with the size. Thus, at some point, the increasing error will offset the gain of reducing the overhead. However, it is noted that default commercial hardware-based NICs reject frames larger than 2304 bytes, even if those frames can be successfully demodulated. Additionally, it is further noted that although the ability to transmit jumbo frames is only one possible optimization, the ability demonstrates that the full programmability offered by implementations of the SDR herein enables researchers to explore such "what if" questions using an inexpensive general purpose computing device SDR platform.

TDMA MAC

To evaluate the ability of implementations of the SDR herein to precisely control the transmission time of a frame, a simple time division multiple access (TDMA) MAC algorithm was implemented that schedules a frame transmission at a predefined time interval. The MAC state machine (SM) runs in an ethread as discussed above with respect to FIG. 9, and the MAC SM continuously queries a timer to check whether the predefined amount of time has elapsed. If so, the MAC SM instructs the RCB to send out a frame. The modification is simple and straightforward with about 20 lines of additional code added to the MAC algorithm.

Since the RCB can indicate to the exemplary WiFi implementation when the transmission completes, and the exact size of the frame is known, it is possible to calculate the exact time when the frame transmits. Tests were conducted with various scheduling intervals under a heavy load, during which files on the local disk are copied, files from a nearby server are download, and a HD video is played back simultaneously, for determining an average error and standard deviation of the error. The average error was found to be less than 1 µs, which is sufficient for most wireless protocols. Also, outliers, which are define as packet transmissions that occur later than 2 µs from the pre-defined schedule, occurred less than 0.5% of the time.

Additional Implementations

Implementations of the SDR herein provide a fully programmable software-defined radio platform on a general-purpose computing device architecture. Implementations of the SDR herein combine the performance and fidelity of hardware-based SDR platforms with the programming flexibility of GPP-based SDR platforms. Implementations of the SDR platform herein have been described in some examples in the context of realizing a software radio that operates using the 802.11a/b/g protocols. However, implementing additional types of software radios, such as 3GPP LTE (Long Term Evolution), W-CDMA, GSM 802.11n, WiMax and various other radio protocols and standards can also be achieved using the SDR platform herein. The flexibility provided by implementations of the SDR herein makes it a convenient platform for experimenting with novel wireless protocols, such as ANC (Analog Network Coding) or PPR (Partial Packet Recovery). Further, by being able to utilize multiple cores, implementations of the SDR herein can scale to support even more complex PHY algorithms, such as MIMO (Multiple-Input Multiple-Output) or SIC (Successive Interference Cancellation).

In addition, implementations herein are not necessarily limited to any particular programming language. It will be appreciated that a variety of programming languages may be used to implement the teachings described herein. Further, it should be noted that the system configurations illustrated in FIGS. 1, 2, 3, 4, 5, 8 and 9 are purely exemplary of systems in which the implementations may be provided, and the implementations are not limited to the particular hardware configurations illustrated.

It may be seen that this detailed description provides various exemplary implementations, as described and as illustrated in the drawings. This disclosure is not limited to the implementations described and illustrated herein, but can extend to other implementations, as would be known or as would become known to those skilled in the art. Reference in the specification to "one implementation", "this implementation", "these implementations" or "some implementations" means that a particular feature, structure, or characteristic described in connection with the implementations is included in at least one implementation, and the appearances of these phrases in various places in the specification are not necessarily all referring to the same implementation. Additionally, in the description, numerous specific details are set forth in order to provide a thorough disclosure. However, it will be apparent to one of ordinary skill in the art that these specific details may not all be needed in all implementations. In other circumstances, well-known structures, materials, circuits, processes and interfaces have not been described in detail, and/or illustrated in block diagram form, so as to not unnecessarily obscure the disclosure.

CONCLUSION

Implementations described herein provide an SDR platform and a high-performance PHY processing library. Implementations of the SDR herein use both hardware and software techniques to achieve high throughput and low latency on a general-purpose computing device architecture for achieving a high-speed SDR. Implementations include an SDR platform that enables users to develop high-speed radio implementations, such as IEEE 802.11a/b/g PHY and MAC, entirely in software on general-purpose computing device architecture. For example, time critical tasks, MAC and PHY processing can be changed and reprogrammed as desired for achieving various purposes. Further, a particular example of the SDR has been described that includes an exemplary WiFi radio system that can interoperate with commercial wireless NICs using 802.11a/b/g standards.

Although the subject matter has been described in language specific to structural features and/or methodological acts, it is to be understood that the subject matter defined in the appended claims is not limited to the specific features or acts described above. Rather, the specific features and acts described above are disclosed as example forms of implementing the claims. Additionally, those of ordinary skill in the art appreciate that any arrangement that is calculated to achieve the same purpose may be substituted for the specific implementations disclosed. This disclosure is intended to cover any and all adaptations or variations of the disclosed implementations, and it is to be understood that the terms used in the following claims should not be construed to limit this patent to the specific implementations disclosed in the specification. Instead, the scope of this patent is to be determined entirely by the following claims, along with the full range of equivalents to which such claims are entitled.

The invention claimed is:

1. A radio control board comprising:
a radio frequency (RF) controller for communicating with an RF front end coupled to the radio control board;
a bus controller for coupling the radio control board for communication with a system bus of a computing device; and
a direct memory access DMA controller for receiving digital samples of the received radio waveforms from the RF front end via the RF controller and for storing the received digital samples in a memory on the computing device via the system bus, wherein:
  the bus controller passes the received digital samples from the DMA controller to the system bus for storage in the memory on the computing device;
  the bus controller is configured to receive generated digital samples from the computing device via the system bus for delivery to the RF controller;
  the RF controller is configured to receive the generated digital samples from the bus controller and pass the generated digital samples to the RF front end for transmission as radio waveforms;

the memory on the computing device is organized into a plurality of slots;

each slot begins with a descriptor that contains an indicator that indicates whether data in the slot has been processed;

the radio control board sets the indicator when a slot of data is written; and a processor on the computing device determines from the indicator whether to process the data in the slot or flush the data corresponding to the slot.

2. The radio control board according to claim 1, wherein the bus is a Peripheral Component Interconnect Express (PCIe) bus.

3. The radio control board according to claim 1, further comprising an onboard memory on the radio control board for at least one of:

storing the generated digital samples temporarily prior to passing the generated digital samples to the RF front end; or storing the received digital samples temporarily prior to passing the received digital samples to the memory on the computing device.

4. The radio control board according to claim 1, further comprising an onboard memory on the radio control board for storing a pre-generated ACK waveform, wherein:

during demodulation of a received frame, the pre-generated ACK is prepared for sending in response to the frame for providing an acknowledgement of receiving the received frame, and following a check of the received frame, the pre-generated ACK is delivered to the RF front end for transmission to acknowledge receipt of the received frame.

5. The radio control board according to claim 1, further comprising:

a first FIFO buffer on the radio control board located between the RF front end and the DMA controller for temporarily storing the digital samples received from the RF front end prior to the DMA controller storing the digital samples on the memory of the computing device; and a second FIFO buffer on the radio control board between the bus controller and the RF front end for temporarily storing processed digital samples received from the computing device prior to delivery of the generated digital samples to the RF front end.

6. A method implemented on a computing device, the method comprising:

receiving a plurality of digital samples in a memory of the computing device from a radio frequency (RF) receiver coupled to a system bus of the computing device, the memory of the computing device being organized into a plurality of slots, each slot of the plurality of slots beginning with a descriptor that contains an indicator;

for a slot of the plurality of slots, setting the indicator for the slot in response to determining that a digital sample of the plurality of digital samples is written to the slot;

using a first core of a multi-core processor to perform at least a portion of physical layer processing of the digital sample as a first kernel thread running on the first core;

using a second core of the multi-core processor to perform media access control (MAC) layer processing of the digital sample as a second kernel thread running on the second core; and determining, based at least in part on the indicator, whether the digital sample in the slot has been processed.

7. The method according to claim 6, wherein the one or more first cores are dedicated to processing the digital sample while one or more second cores of the multi-core processor execute one or more applications.

8. The method according to claim 7, wherein the one or more first cores are dedicated to processing of the digital sample by initiating a kernel thread for processing the digital sample, and raising the priority of the thread and/or an interrupt request level of the kernel thread so that the kernel thread runs exclusively on a particular first core until termination.

9. The method according to claim 8, further comprising removing interrupt handlers for installed devices from the particular first core to prevent the particular first core from being interrupted by hardware until termination of the kernel thread.

10. The method according to claim 6, further comprising:

passing the plurality of digital samples from the RF receiver to the memory of the computing device by a radio control board coupled between the RF receiver and the memory of the computing device, wherein the plurality of digital samples are passed from the RF receiver to the memory of the computing device on a Peripheral Component Interconnect Express (PCIe) bus.

11. The method according to claim 6, further comprising using single instruction multiple data (SIMD) instructions to simultaneously process an array of the plurality of digital samples during at least one of the physical layer processing or the media access control (MAC) layer processing of the plurality of digital samples.

12. The method according to claim 6, further comprising:

pre-calculating one or more lookup tables for one or more physical layer algorithms and/or one or media access control (MAC) layer algorithms;

storing the one or more lookup tables in a cache associated with the one or more first cores; and accessing the lookup tables during processing of the digital sample in place of performing calculations for the corresponding algorithms during the physical layer processing and/or the MAC layer processing of the digital sample.

13. The method according to claim 6, further comprising performing physical layer processing of the digital sample using at least two first cores of the multi-core processor, wherein a first sub-pipeline of functional physical layer blocks is executed on a first one of the first cores and a second sub-pipeline of physical layer blocks is executed on a second one of the first cores.

14. The method according to claim 13, wherein one of the first cores acts as a consumer of data and the other first core acts as a producer of data, further comprising:

providing a circular First In First Out (FIFO) buffer between the consumer and the producer, wherein the FIFO buffer includes a plurality of data slots, wherein each data slot includes an indicator as to whether the data slot is full or empty, wherein the FIFO buffer further includes a pointer for the consumer and a pointer for the producer;

wherein the consumer pointer follows the producer pointer to take data from the FIFO for consumption by the consumer.

15. The method according to claim 6, the method further comprising:

raising the priority and/or an interrupt request level of each of the first kernel thread and the second kernel thread so that each kernel thread runs exclusively on the corresponding first core and second core until termination of the respective kernel thread.

16. One or more computer-readable storage media maintaining processor-executable instructions that, when executed by a processor, implement modules comprising:

a management module for controlling a radio control board for delivery of digital samples between a radio frequency (RF) transceiver and a memory on a computing device via a system bus;

a media access control module for performing MAC layer processing of the digital samples on one or more first cores of a multi-core processor; and a physical layer module for performing physical layer processing of the digital samples, at least in part, on one or more second cores of the multi-core processor, wherein:

the memory on the computing device is organized into a plurality of slots;

a slot of the plurality of slots is associated with an indicator that indicates whether a digital sample of the plurality of digital samples in the slot has been processed; and the indicator is set when the digital sample in the slot is written.

17. The one or more computer-readable storage media according to claim 16, wherein:

the management module further includes a direct memory access (DMA) manager for controlling a DMA controller on the radio control board, the DMA controller delivers the digital samples from the RF transceiver to a DMA memory portion of the memory on the computing device, the DMA manager sets a flag on the digital samples when written to the memory, and the processor processing the digital samples checks the flag before reading data in a cache to avoid inconsistency between the data in the cache and the data in the DMA memory.

18. The one or more computer-readable storage media according to claim 16, wherein the management module includes a Peripheral Component Interconnect Express (PCIe) driver for controlling the radio control board for delivery of the digital samples between the radio frequency (RF) transceiver and the memory on the computing device via the system bus, wherein the system bus is a PCIe bus.

19. The one or more computer-readable storage media according to claim 16, wherein the media access control module and the physical layer module are controlled by the management module for processing digital samples on the multi-core processor.

* * * * *